United States Patent [19]

Forsberg

[11] Patent Number: 4,708,753

[45] Date of Patent: Nov. 24, 1987

[54] WATER-IN-OIL EMULSIONS

[75] Inventor: John W. Forsberg, Mentor-on-the-Lake, Ohio

[73] Assignee: The Lubrizol Corporation, Wickliffe, Ohio

[21] Appl. No.: 947,441

[22] Filed: Dec. 29, 1986

Related U.S. Application Data

[63] Continuation of Ser. No. 806,164, Dec. 6, 1985, abandoned, Continuation of Ser. No. 806,164, Dec. 6, 1985, abandoned.

[51] Int. Cl.$^4$ .............................................. C06G 45/00
[52] U.S. Cl. ........................................ 149/2; 149/38; 149/39; 149/43; 149/46; 149/47; 149/60; 149/92; 149/105; 252/309; 252/356
[58] Field of Search .................... 149/2, 46, 47, 60, 38, 149/39, 43, 92, 105; 252/309, 356, 359

[56] References Cited

U.S. PATENT DOCUMENTS

| | | | |
|---|---|---|---|
| 2,345,199 | 3/1944 | Hodson | 252/19 |
| 3,027,324 | 3/1962 | Rosenberg | 252/8.5 |
| 3,047,493 | 7/1962 | Rosenberg | 252/8.5 |
| 3,161,551 | 12/1964 | Egly et al. | 149/46 |
| 3,212,945 | 10/1965 | Berthmann et al. | 149/51 |
| 3,216,936 | 11/1965 | Le Suer | 252/32.7 |
| 3,219,666 | 11/1965 | Norman et al. | 260/268 |
| 3,269,946 | 8/1966 | Wiese | 252/32.5 |
| 3,281,356 | 10/1966 | Coleman | 252/32.7 |
| 3,311,558 | 3/1967 | Prizer et al. | 252/47.5 |
| 3,311,561 | 3/1967 | Anderson et al. | 252/75 |
| 3,364,001 | 1/1968 | Drummond et al. | 44/71 |
| 3,378,494 | 4/1968 | Berger | 252/77 |
| 3,397,097 | 8/1968 | Ataden et al. | 149/46 |
| 3,442,727 | 5/1969 | Thornton | 149/46 |
| 3,447,978 | 6/1969 | Bluhm | 149/2 |
| 3,447,979 | 6/1969 | Bluhm et al. | 149/19 |
| 3,453,155 | 7/1969 | Sheeran et al. | 149/5 |
| 3,459,608 | 8/1969 | Ludalphy et al. | 149/56 |
| 3,541,012 | 11/1970 | Stuebe | 252/51.5 |
| 3,576,743 | 4/1971 | Widmer et al. | 252/51.5 |
| 3,617,406 | 11/1971 | Young | 149/41 |
| 3,629,119 | 12/1971 | Weaver | 252/77 |
| 3,632,511 | 1/1972 | Liao | 252/51.5 |
| 3,658,707 | 4/1972 | Delafield et al. | 252/51.5 |
| 3,674,578 | 7/1972 | Cattermole et al. | 149/2 |
| 3,687,644 | 8/1972 | Delafield et al. | 44/56 |
| 3,715,247 | 2/1973 | Wade | 149/21 |
| 3,765,964 | 10/1973 | Wade | 149/2 |
| 3,770,522 | 11/1973 | Tomis | 149/2 |
| 3,794,534 | 2/1974 | Chandler | 149/2 |
| 3,836,470 | 9/1974 | Miller | 252/51.5 |
| 3,836,471 | 9/1974 | Miller | 252/51.5 |
| 3,838,052 | 9/1974 | Miller | 252/56 |
| 3,865,813 | 2/1975 | Gergel | 260/239.3 |
| 3,868,330 | 2/1975 | Meinhardt et al. | 252/33.6 |
| 3,948,800 | 4/1976 | Meinhardt | 252/356 |
| 3,957,854 | 5/1976 | Miller | 260/482 |
| 4,008,108 | 2/1977 | Chrisp | 149/2 |
| 4,010,105 | 3/1977 | Holgado | 252/77 |
| 4,048,080 | 9/1977 | Lee et al. | 252/51.54 |
| 4,053,426 | 10/1977 | Dairs et al. | 252/34 |
| 4,098,585 | 7/1978 | Vartanian et al. | 44/63 |
| 4,110,134 | 8/1978 | Wade | 149/2 |
| 4,111,727 | 9/1978 | Clay | 149/2 |
| 4,138,281 | 2/1979 | Olney et al. | 149/2 |
| 4,140,640 | 2/1979 | Scherbal et al. | 252/8.55 |
| 4,141,767 | 2/1979 | Sudweeks et al. | 149/2 |
| 4,149,916 | 4/1979 | Wade | 149/56 |
| 4,149,917 | 4/1979 | Wade | 149/56 |
| 4,181,546 | 1/1980 | Clay | 149/21 |
| 4,185,485 | 1/1980 | Schick et al. | 72/42 |
| 4,216,040 | 8/1980 | Sudweeks et al. | 149/21 |
| 4,218,272 | 8/1980 | Brockington | 149/21 |
| 4,225,447 | 9/1980 | Law et al. | 252/34.7 |
| 4,230,588 | 10/1980 | Bonazza et al. | 252/51.5 |
| 4,231,821 | 11/1980 | Sudweeks et al. | 149/21 |
| 4,233,165 | 11/1980 | Salathiel et al. | 252/8.55 |
| 4,234,435 | 11/1980 | Meinhardt et al. | 252/51.5 |
| 4,248,644 | 2/1981 | Healy | 149/21 |
| 4,253,974 | 3/1981 | Valcho et al. | 252/8.55 |
| 4,253,975 | 3/1981 | Law et al. | 252/32.7 |

List continued on next page

FOREIGN PATENT DOCUMENTS

| | | |
|---|---|---|
| 0155800 | 9/1985 | European Pat. Off. |
| 0156572 | 10/1985 | European Pat. Off. |
| 984409 | 2/1965 | United Kingdom |
| 1009197 | 11/1965 | United Kingdom |
| 1020293 | 2/1966 | United Kingdom |
| 1031130 | 5/1966 | United Kingdom |
| 1098936 | 1/1968 | United Kingdom |
| 1206059 | 9/1970 | United Kingdom |
| 1214245 | 12/1970 | United Kingdom |
| 1306546 | 2/1973 | United Kingdom |
| 1335097 | 10/1973 | United Kingdom |
| 1423876 | 2/1976 | United Kingdom |
| 1532836 | 11/1978 | United Kingdom |
| 1538092 | 1/1979 | United Kingdom |
| 1557917 | 12/1979 | United Kingdom |
| 2042495 | 9/1980 | United Kingdom |
| 2058740 | 4/1981 | United Kingdom |

*Primary Examiner*—Stephen J. Lechert, Jr.
*Attorney, Agent, or Firm*—Denis A. Polyn; Forrest L. Collins; Karl Bozicevic

[57] ABSTRACT

A water-in-oil emulsion is disclosed which comprises:
(A) a continuous oil phase;
(B) a discontinuous aqueous phase;
(C) a minor emulsifying amount of at least one salt derived from (C)(I) at least one hydrocarbyl-substituted carboxylic acid or anhydride, or ester or amide derivative of said acid or anhydride, the hydrocarbyl substituent of (C)(I) having an average of from about 20 to about 500 carbon atoms, and (C)(II) at least one amine; and
(D) a functional amount of at least one water-soluble, oil-insoluble functional additive dissolved in said aqueous phase; with the proviso that when component (D) is ammonium nitrate, component (C) is other than an ester/salt formed by the reaction of polyisobutenyl (Mn=950) succinic anhydride with diethylethanolamine in a ratio of one equivalent of anhydride to one equivalent of amine.

51 Claims, No Drawings

U.S. PATENT DOCUMENTS

| | | | |
|---|---|---|---|
| 4,287,010 | 9/1981 | Owen | 149/2 |
| 4,294,633 | 10/1981 | Clay | 149/2 |
| 4,310,364 | 1/1982 | Ekman et al. | 149/2 |
| 4,315,784 | 2/1982 | Hattori et al. | 149/2 |
| 4,315,787 | 2/1982 | Hattori et al. | 149/2 |
| 4,319,784 | 2/1982 | Hattori et al. | 149/2 |
| 4,326,900 | 4/1982 | Hattori et al. | 149/2 |
| 4,329,249 | 5/1982 | Forsberg | 252/34.7 |
| 4,343,663 | 8/1982 | Breza | 149/4 |
| 4,357,184 | 11/1982 | Binet et al. | 149/2 |
| 4,368,133 | 1/1983 | Forsberg | 252/75 |
| 4,383,873 | 5/1983 | Wade et al. | 149/2 |
| 4,391,659 | 7/1983 | Smith | 149/2 |
| 4,394,198 | 7/1983 | Takeuchi et al. | 149/21 |
| 4,404,050 | 9/1983 | Yorke et al. | 149/2 |
| 4,435,297 | 3/1984 | Forsberg | 252/34.7 |
| 4,447,348 | 5/1984 | Forsberg | 252/75 |
| 4,448,619 | 5/1984 | Mitchell | 149/21 |
| 4,448,703 | 5/1984 | Forsberg | 252/75 |
| 4,472,215 | 9/1984 | Binet et al. | 149/109.6 |
| 4,490,194 | 12/1984 | Cooper et al. | 149/2 |
| 4,490,195 | 12/1984 | Cooper et al. | 149/2 |
| 4,496,405 | 1/1985 | Cechinski | 149/2 |
| 4,504,276 | 3/1985 | Baker | 44/51 |
| 4,525,225 | 6/1985 | Cechinski | 149/19.5 |
| 4,548,660 | 10/1985 | Ikeda et al. | 149/2 |
| 4,554,032 | 11/1985 | Hattori et al. | 149/21 |
| 4,555,278 | 11/1985 | Cescon et al. | 149/21 |
| 4,615,751 | 10/1986 | Smith et al. | 149/2 | though many of the emulsifiers described in the prior art are meritorious, none have provided emulsion stability characteristics that are entirely satisfactory. Additonally, with most emulsifiers used in the prior art, selection of the fuel or oil for the continuous phase is generally limited to highly-refined, highly paraffinic oils such as white oils.

WATER-IN-OIL EMULSIONS

This is a continuation of U.S. application Ser. No. 806,164, filed Dec. 6, 1985, now abandoned. The disclosure of said prior application is incorporated herein by reference in its entirety.

TECHNICAL FIELD

This invention relates to water-in-oil emulsions and, more particularly, to water-in-oil emulsions containing nitrogen-containing salt emulsifiers and water-soluble, oil-insoluble functional additives. The utility of these emulsions is dependent upon the specific functional additives employed and includes that of hydraulic fluids, explosives and acidizing fluids.

BACKGROUND OF THE INVENTION

Water-in-oil emulsions have found wide acceptance as fire-resistant hydraulic fluids in general industry, coal mines and rolling mills where fire hazards exist. These hydraulic fluids are generally used in applications where the fluid could spray or drip from a break or leak onto a source of ignition, e.g., a pot of molten metal or a gas flame. This condition often exists in die-casting machines or in presses located near furnaces. Typically, these hydraulic fluids are constituted of a continuous oil phase, a discontinuous aqueous phase, at least one emulsifying agent, and one or more functional additives such as rust-inhibiting agents, extreme-pressure agents, foam inhibitors, freezing point depressants, bactericides, oxidation inhibitors, and the like. Examples of such hydraulic fluids are disclosed in U.S. Pat. Nos. 3,255,108; 3,269,946; 3,281,356; 3,311,4561; 3,378,494; 3,629,119; and 4,225,447; these patents being incorporated herein by reference.

A problem with water-in-oil hydraulic fluids is that they have a tendency to cause wear of metallic pump parts and other equipment with which they come into contact. The water phase, though dispersed in the oil phase, creates wear problems that are not encountered with straight petroleum oil compositions. Another problem is that the water phase tends to corrode the metallic parts it contacts. Water-phase additives which have been employed previously to reduce wear and/or corrosion have had the disadvantage that they tend to precipitate from the emulsion, particularly when the water content becomes reduced during use. The omission of water-phase additives, on the other hand, is undesirable since it is frequently impossible to obtain satisfactory wear- and/or corrosion-resistance by the use of additives which are dissolved only in the oil phase.

Explosive emulsions are typically constituted of continuous organic fuel or oil phase in which descrete droplets of an aqueous solution of an oxygen-supplying source are dispersed as a discontinuous phase. Such compositions are conventionally described as water-in-oil explosive emulsion compositions, and examples thereof have been described, inter alia, in U.S. Pat. Nos. 3,447,978; 3,985,593; 4,008,110; 4,097,316; 4,104,092; 4,110,134; 4,149,916; 4,149,917; 4,218,272; 4,259,977; 4,357,184; 4,371,408; 4,404,050; 4,409,044; 4,453,989; and 4,534,809; and European Application Publication No. 0,155,800 A1, which are incorporated herein by reference. Formation of these explosive emulsions is generally effected in the presence of an emulsifier which is selected to promote subdivision of the droplets of the oxidizer phase and dispersion thereof in the continuous phase. While many of the emulsifiers described in the prior art are meritorious, none have provided emulsion stability characteristics that are entirely satisfactory. Additonally, with most emulsifiers used in the prior art, selection of the fuel or oil for the continuous phase is generally limited to highly-refined, highly paraffinic oils such as white oils.

Acid treating or acidizing of porous subterranean formations penetrated by a well bore has been widely employed for increasing the production of fluids, e.g., crude oil, natural gas, etc., from the formations. The usual technique of acidizing a formation comprises introducing a nonoxidizing acid into the well under sufficient pressure to force the acid out into the formation where it reacts with the acid-soluble components of the formation. The technique is applicable to formations of high acid solubility such as limestone, dolomite, etc., as well as to other types of formations such as a sandstone containing streaks or striations of acid-soluble components such as the various carbonates. During the acid treating operation, passageways for fluid flow are created in the formation, or existing passageways therein are enlarged, thus stimulating the production of fluids from the formation. This action of the acid on the formation is often called etching. Acid treating or acidizing operations wherein the acid is injected into the formation at a pressure or rate insufficient to create cracks or fractures in the formation is usually referred to as matrix-acidizing. Various acidizing compositions have been disclosed in the prior art. Examples are disclosed, inter alia, in U.S. Pat. Nos. 4,136,739; 4,137,182; 4,137,400; 4,137,972; 4,143,007; 4,144,179; 4,146,486; 4,148,360; 4,148,736; 4,151,098; 4,152,274; 4,152,289; 4,153,066; 4,153,649; 4,160,483; 4,163,727; 4,167,214; 4,169,797; 4,169,798; 4,169,818; 4,169,945; 4,172,041; 4,172,055; 4,174,283; 4,191,657; 4,200,151; 4,200,539; 4,200,540; 4,202,795; 4,203,492; 4,205,724; 4,206,058; 4,210,205; 4,210,206; 4,215,001; 4,217,231; 4,219,429; 4,225,445; 4,244,826; and 4,246,124, these patents being incorporated herein by reference. Examples of water-in-oil emulsions used in acidizing are disclosed in U.S. Pat. Nos. 4,140,640 and 4,233,165, which are incorporated herein by reference.

Hydrocarbyl-substituted carboxylic acylating agents having at least 30 aliphatic carbon atoms in the substituent are known. The use of such carboxylic acylating agents as additives in normally liquid fuels and lubricants is discussed in U.S. Pat. Nos. 3,288,714 and 3,346,354. These acylating agents are also useful as intermediates for preparing additives for use in normally liquid fuels and lubricants as described in U.S. Pat. Nos. 2,892,786; 3,087,936; 3,163,603; 3,172,892; 3,189,544; 3,215,707; 3,219,666; 3,231,587; 3,235,503; 3,272,746; 3,306,907; 3,306,908; 3,331,776; 3,341,542; 3,346,354; 3,374,174; 3,379,515; 3,381,022; 3,413,104; 3,450,715; 3,454,607; 3,455,728; 3,476,686; 3,513,095; 3,523,768; 3,630,904; 3,632,511; 3,697,428; 3,775,169; 3,804,763; 3,836,470; 3,862,981; 3,936,480; 3,948,909; 3,950,341; 4,234,435; and 4,471,091; and French Pat. No. 2,223,415.

Nitrogen-containing, phosphorus-free carboxylic solubilizers useful in high water based functional fluids are disclosed in U.S. Pat. Nos. 4,329,249; 4,368,133; 4,435,297; 4,447,348; and 4,448,703. These solubilizers are made by reacting (I) at least one carboxylic acid acylating agent having at least one hydrocarbyl-based substituent of at least about 12 to about 500 carbon atoms with (II) at least one (a) N-(hydroxyl-substituted hydrocarbyl) amine, (b) hydroxyl-substituted poly(hydrocarbyloxy) analog of said amine (a), or (c) mixtures of (a) and (b). These patents indicate that the preferred acylating agents include the substituted succinic acids or anhydrides and that the amines that are useful include the primary, secondary and tertiary alkanol amines. These solubilizers are useful in dispersing or dissolving oil-soluble, water-insoluble functional additives in water-based functional fluids. These references indicate that a particularly preferred embodiment of the solubilizer is the reaction product of a polyisoubtenyl-substituted succinic anhydride with diethylethanolamine or a mixture of diethylethanolamine and ethanolamine.

SUMMARY OF THE INVENTION

An advantage of the present invention is that stable water-in-oil emulsions are provided which are useful as hydraulic fluids, explosives and acidizing solutions. A particular advantage of the invention with respect to hydraulic fluids relates to the provision of water-phase functional additives which improve the rust-inhibition and anti-wear characteristics of such fluids. A particular advantage with respect to explosives is an increased flexibility in the selection of oils or fuels for the continuous phase.

Broadly stated, the present invention contemplates the provision of a water-in-oil emulsion comprising:
(A) a continuous oil phase;
(B) a discontinuous aqueous phase;
(C) a minor emulsifying amount of at least one salt derived from (C) (I) at least one hydrocarbyl-substituted carboxylic acid or anhydride, or ester or amide derivative of said acid or said anhydride, the hydrocarbyl substituent of (C) (I) having an average of from about 20 to about 500 carbon atoms; and (C) (II) at least one amine; and
(D) a functional amount of at least one water-soluble, oil-insoluble functional additive, dissolved in said aqueous phase; with the proviso that when component (D) is ammonium nitrate, component (C) is other than an ester/salt formed by the reaction of polyisobutenyl (Mn=950) substituted succinic anhydride with diethylethanolamine in a ratio of one equivalent of anhydride to one equivalent of amine.

In a preferred embodiment, the invention provides for a hydraulic fluid comprising:
(A) a continuous oil phase;
(B) a discontinuous aqueous phase;
(C) a minor emulsifying amount of at least one salt derived from (C) (I) at least one hydrocarbyl-substituted carboxylic acid or anhydride, or ester or amide derivative of said acid or anhydride, the hydrocarbyl substituent of (C) (I) having an average of from about 20 to about 500 carbon atoms, and (C) (II) at least one amine; and
(D) a functional amount of at least one borate, phosphate and/or molybdate dissolved in said aqueous phase.

In another preferred embodiment, the invention provides for an acidizing fluid comprising:
(A) a continuous oil phase;
(B) a discontinuous aqueous phase;
(C) a minor emulsifying amount of at least one salt derived from (C) (I) at least one hydrocarbyl-substituted carboxylic acid or anhydride, or ester or amide derivative of said acid or anhydride, the hydrocarbyl substituent of (C) (I) having an average of from about 20 to about 500 carbon atoms, and (C) (II) at least one amine; and
(D) a functional amount of at least one non-oxidizing acid dissolved in said aqueous phase.

In still another preferred embodiment, the invention provides for an explosive emulsion comprising:
(A) a continuous oil phase;
(B) a discontinuous aqueous phase;
(C) a minor emulsifying amount of at least one salt derived from (C) (I) at least one hydrocarbyl-substituted carboxylic acid or anhydride, or ester or amide derivative of said acid or anhydride, the hydrocarbyl substituent of (C) (I) having an average of from about 20 to about 500 carbon atoms, and (C) (II) at least one amine; and
(D) a functional amount of at least one oxygen-supplying salt dissolved in said aqueous phase; with the proviso that when component (D) is ammonium nitrate, component (C) is other than an ester/salt formed by the reaction of polyisobutenyl (Mn=950) substituted succinic anhydride with diethylethanolamine in a ratio of one equivalent of anhydride to one equivalent of amine.

DESCRIPTION OF THE PREFERRED EMBODIMENTS

The term "hydrocarbyl" is used herein to include substantially hydrocarbyl groups as well as purely hydrocarbyl groups. The description of these groups as being substantially hydrocarbyl means that they contain no non-hydrocarbyl substituents or non-carbon atoms which sifnificantly affect the hydrocarbyl characteristics or properties of such groups relevant to their uses as described herein. Non-limiting examples of substituents which do not significantly alter the hydrocarbyl characteristics or properties of the general nature of the hydrocarbyl groups of this invention include the following:

Ether groups (especially hydrocarbyloxy such as phenoxy, benzyloxy, methoxy, n-butoxy, etc., and particularly alkoxy groups of up to about 10 carbon atoms);

Oxo groups (e.g., —O— linkages in the main carbon chain);

Nitro groups;

Thioether groups (especially $C_{1-10}$ alkyl thioether);

Thia groups (e.g., —S— linkages in the main carbon chain);

Carbohydrocarbyloxy groups (e.g.,

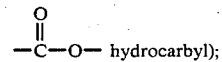

Sulfonyl groups (e.g.,

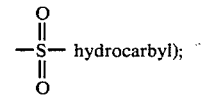

Sulfinyl groups (e.g.,

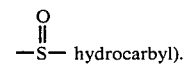

This list is intended to be merely illustrative and not exhaustive, and the omission of a certain class of substituent is not meant to require its exclusion. In general, if such substituents are present, there will not be more than two for each 10 carbon atoms in the substantially hydrocarbyl group and preferably not more than one for each 10 carbon atoms since this number of substituents usually will not substantially affect the hydrocarbyl characteristics and properties of the group. Nevertheless, the hydrocarbyl groups are preferably free from non-hydrocarbon groups; that is, they are preferably hydrocarbyl groups consisting of only carbon and hydrogen atoms.

The term "lower" as used in the present specification and claims, when used in conjunction with terms such as alkyl, alkenyl, alkoxy, and the like, is intended to describe such groups which contain a total of up to 7 carbon atoms.

The term "water-soluble" refers to materials which are soluble in water to the extent of at least one gram per 100 milliliters of water at 25° C.

The term "oil-insoluble" refers to materials which are not soluble in mineral oil above a level of about one gram per 100 milliliters of oil at 25° C.

The term "functional amount" refers to a sufficient quantity of an additive to impart desired properties intended by the addition of said additive. For example, if an additive is a rust-inhibitor, a functional amount of said rust-inhibitor would be an amount sufficient to increase the rust-inhibiting characteristics of the emulsion to which it is added. Similarly, if the additive is an anti-wear agent, a functional amount of said anti-wear agent would be a sufficient quantity of the anti-wear agent to improve the anti-wear characteristics of the emulsion to which it is added.

The oil phase (A) of the water-in-oil emulsions of the invention is a continuous oil phase, while the aqueous phase (B) is a discontinuous aqueous phase dispersed in the oil phase (A). The functional additive (D) is dissolved in the dispersed aqueous phase (B). The emulsifying salt (C) stabilizers the emulsion. The inventive emulsions preferably comprise: from about 2% to about 70% by weight, more preferably from about 4% to about 60% by weight based on the total weight of said emulsion of component (A); from about 1% to about 98% by weight, more preferably from about 3% to about 96% by weight of component (B); and from about 0.05% to about 30% by weight, more preferably from about 0.2% to about 15% by weight, more preferably from about 0.2% to about 10% by weight, more preferably from about 0.2% to about 5% by weight, more preferably from about 0.5% to about 2% by weight of component (C). The level of addition of component (D) is in the broad range of from about 0.05% to about 95% by weight based on the total weight of said emulsion. The level of addition of component (D) is dependent upon the anticipated use of the inventive emulsion as discussed more fully below.

These emulsions have a variety of uses depending, inter alia, upon the specific functional additive (D) that is used. For example, these emulsions can be used as hydraulic fluids. For such hydraulic fluids, the functional additive (D) is preferably a rust-inhibiting and/or anti-wear agent such as, for example, a phosphate, borate or molybdate. In such hydraulic fluids, the oil phase (A) is preferably present at a level in the range of from about 40% to about 70% by weight, more preferably from about 50% to about 65% by weight based on the total weight of said emulsion. The aqueous phase (B) is preferably present at a level in the range of from about 30% to about 60%, more preferably from about 35% to about 50% by weight based on the total weight of said emulsion. Component (C) is preferably present in these hydraulic fluids at a level in the range of from about 2.5 to about 25% by weight, more preferably from about 5 to about 15% by weight based on the total weight of the oil phase (A). The functional additive (D) is preferably present at a level in the range of from about 0.2 to about 20% by weight, more preferably from about 0.5 to about 10% by weight based on the total weight of the aqueous phase (B).

These emulsions can also be used in enhanced oil recovery processes as acidizing fluids. For such acidizing fluids the functional additive is preferably a non-oxidizing acid. In such acidizing fluids the oil phase (A) is preferably present at a level in the range of from about 20% to about 70% by weight, more preferably from about 40% to about 60% by weight based on the total weight of said emulsion. The aqueous phase (B) is preferably present at a level in the range of from about 30% to about 80% by weight, more preferably from about 40% to about 60% by weight based on the total weight of said emulsion. Component (C) is preferably present at a level in the range of from about 4% to about 40% by weight, more preferably from about 10% to about 20% by weight based on the total weight of the oil phase (A). The functional additive (D) is preferably present at a level in the range of from about 10% to about 90% by weight, more preferably from about 30% to about 80% by weight of the total weight of the aqueous phase (B).

These emulsions can also be used as explosive emulsions. For such explosive emulsions the functional additive (D) is preferably an oxygen-supplying salt. In such explosive emulsions the oil phase (A) is preferably present at a level in the range of from about 2% to about 15% by weight, more preferably from about 4% to about 8% by weight based on the total weight of said emulsion. The aqueous phase (B) is preferably present at a level in the range of from about 85% to about 98% by weight, more preferably from about 92% to about 96% by weight based on the total weight of said emulsion. Component (C) is preferably present at a level in the range of from about 4% to about 40% by weight, more preferably from about 12% to about 20% by weight based on the total weight of the oil phase (A). The functional additive (D) is preferably present at a level in the range of about from 70% to about 95% by weight, more preferably from about 85% to about 92% by weight, more preferably from about 87% to about 90% by weight based on the total weight of the aqueous phase (D).

These emulsions can also contain additional additives to improve the properties of said emulsions; these additional additives, which are dependent upon the intended use for the emulsion, are discussed more fully below.

The Oil (A)

The oil that is useful in the inventive emulsions can be a hydrocarbon oil having viscosity values from about 20 SUS (Saybolt Universal Seconds) at 40° C. to about 2500 SUS at 40° C. Mineral oils having lubricating viscosities (e.g., SAE 5-90 grade) can be used. Oils from a variety of sources, including natural and synthetic oils and mixtures thereof can be used.

Natural oils include animal oils and vegetable oils (e.g., castor oil, lard oil) as well as solvent-refined or acid-refined mineral lubricating oils of the paraffinic, naphthenic, or mixed paraffin-naphthenic types. Oils of lubricating viscosity derived from coal or shale are also useful. Synthetic lubricating oils include hydrocarbon oils and halo-substituted hydrocarbon oils such as polymerized and interpolymerized olefins (e.g., polybutylenes, polypropylenes, propyleneisobutylene copolymers, chlorinated polybutylenes, etc.); alkyl benzenes (e.g., dodecylbenzenes, tetradecylbenzenes, dinonylbenzenes, di-(2-ethylhexyl)benzenes, etc.); polyphenols (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra-(2-ethylhexyl)-silicate, tetra-(4-methyl-2-tetraethyl)-silicate, tetra-(p-tert-butylphenyl)-silicate, hexyl-(4-methyl-2-pentoxy)-di-siloxane, poly(methyl)-siloxanes, poly(methylphenyl)-siloxanes, etc.). Other synthetic oils include liquid esters of phorphorus-containing acids (e.g., tricresyl phosphate, trioctyl phosphate, diethyl ester of decane phosphonic acid, etc.), polymeric tetrahydrofurans, and the like.

Unrefined, refined and rerefined oils (and mixtures of each with each other) of the type disclosed hereinabove can be used in the emulsions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. In the case wherein the inventive emulsions are used as acidizing fluids in enhanced oil recovery processes, the oil can be unrefined oil obtained directly from the subterranean oil reservoir being treated with such fluids. Refined oils are similar to the unrefined oils except that they have been further treated in one or more purification steps to improve one or more properties. Many such purification techniques are known to those of skill in the art such as solvent extraction, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

The Hydrocarbyl-Substituted Carboxylic Acid or Anhydride, or Ester or Amide Derivative (C) (I)

The hydrocarbyl-substituted carboxylic acid or anhydride, or ester or amide derivatives of said acid or anhydride, are made by reacting one or more alpha-beta olefinically unsaturated carboxylic acid reagents containing two to about 20 carbon atoms, exclusive of the carboxyl-based groups, with one or more olefin polymers containing at least about 20 carbon atoms, as described more fully hereinafter.

The alpha-beta olefinically unsaturated carboxylic acids may be either monobasic or polybasic in nature. Exemplary of the monobasic alpha-beta olefinically unsaturated carboxylic acids include the carboxylic acids corresponding to the formula:

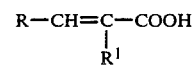

wherein R is hydrogen, or a saturated aliphatic or alicyclic, aryl, alkylaryl or heterocyclic group, preferably hydrogen or a lower alkyl group, and $R_1$ is hydrogen or a lower alkyl group. The total number of carbon atoms in R and $R_1$ should not exceed about 18 carbon atoms. Specific examples of useful monobasic alpha-beta olefinically unsaturated carboxylic acids include acrylic acid; methacrylic acid; cinnamic acid; crotonic acid; 3-phenyl propenoic acid; alpha, beta-decenoic acid, etc. The polybasic acids are preferably dicarboxylic, although tri- and tetracarboxylic acids can be used. Exemplary polybasic acids include maleic acid, fumaric acid, mesaconic acid, itaconic acid and citraconic acid.

The alpha-beta olefinically unsaturated carboxylic acid reagents can also be the anhydride, ester or amide functional derivatives of the foregoing acids. A preferred alpha-beta olefinically unsaturated carboxylic acid reagent is maleic anhydride. Methods of preparing such functional derivatives are well known to those of ordinary skill in the art and they can be satisfactorily described by noting the reactants used to produce them. Thus, for example, derivative esters for use in the present invention can be made by esterifying monohydric or polyhydric alcohols or epoxides with any of the aforedescribed acids or anhydrides. Derivative amides can be made by reacting any of the aforedescribed acids or anhydrides with ammonia, primary amines and secondary amines. The amines and alcohols described hereinafter can be used to prepare these functional derivatives.

In general, the hydrocarbyl substituents present in the hydrocarbyl-substituted carboxylic acids or anhydrides, or ester or amide derivatives are free from acetylenic unsaturation; ethylenic unsaturation, when present will generally be such that there is no more than one ethylenic linkage present for every ten carbon-to-carbon bonds in the substituent. The substituents are often completely saturated and therefore contain no ethylenic unsaturation. These hydrocarbyl substituents have an average of from about 20 to about 500 carbon atoms, more preferably from about 30 to about 500 carbon atoms, more preferably from about 40 to about 500 carbon atoms, more preferably from about 50 to about 500 carbon atoms. These hydrocarbyl-based substituents are preferably hydrocarbyl, alkyl or alkenyl groups.

These hydrocarbyl substituents may be derived from olefin polymers or chlorinated analogs thereof. The olefin monomers from which the olefin polymers are derived are polymerizable olefins and monomers characterized by having one or more ethylenic unsaturated groups. They can be monoolefinic monomers such as ethylene, propylene, butene-1, isobutene and octene-1 or polyolefinic monomers (usually di-olefinic monomers such as butadiene-1,3 and isoprene). Usually these monomers are terminal olefins, that is, olefins characterized by the presence of the group $>C=CH_2$. However, certain internal olefins can also serve as monomers (these are sometimes referred to as medial olefins). When such medial olefin monomers are used, they normally are employed in combination with terminal olefins to produce olefin polymers which are interpolymers. Although the hydrocarbyl substituents may also include aromatic groups (especially phenyl groups and lower alkyl and/or lower alkoxy-substituted phenyl groups such as para(tertiary butyl)-phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are expections to this general rule.

Generally the olefin polymers are homo- or interpolymers of terminal hydrocarbyl olefins of about two to about 16 carbon atoms. A more typical class of olefin polymers is selected from that group consisting of homo- and interpolymers of terminal olefins of about two to about six carbon atoms, especially those of about two to about four carbon atoms.

Specific examples of terminal and medial olefin monomers which can be used to prepare the olefin polymers from which the hydrocarbyl substituents are derived include ethylene, propylene, butene-1, butene-2, isobutene, pentene-1, hexene-1, heptene-1, octene-1, nonene-1, docene-1, pentene-2, propylene tetramer, diisobutylene, isobutylene trimer, butadiene-1,2, butadiene-1,3, pentadiene-1,2, pentadiene-1,3, isoprene, hexadiene-1,5, 2-chlorobutadiene-1,3, 2-methylheptene-1, 3-cyclohexylbutene-1, 3,3-dimethylpentene-1, styrenedivinyldbenzene, vinylacetate, allyl alcohol, 1-methylvinylacetate, acrylonitrile, ethylacrylate, ethylvinylether and methylvinylketone. Of these, the purely hydrocarbyl monomers are preferred and the terminal olefin monomers are especially preferred.

In a particularly advantageous embodiment of the invention, the olefin polymers are poly(isobutene)s such as obtained by polymerization of a $C_4$ refinery stream having a butene content of about 35 to about 75% by weight and an isobutene content of about 30 to about 60% by weight in the presence of a Lewis acid catalyst such as aluminum chloride or boron trifluoride. These polyisobutenes preferably contain predominantly (that is, greater than about 80% of the total repeat units) isobutene repeat units of the configuration.

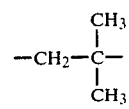

Preferred acids and anhydrides are the hydrocarbyl-substituted succinic acids and anhydrides represented by the formulae:

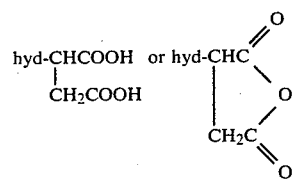

wherein "hyd" is the hydrocarbyl substituent.

The hydrocarbyl-substituted carboxylic acids, and anhydrides, and ester and amide derivatives thereof, can be prepared by any of several known procedures which are described in the following U.S., British and Canadian patents: U.S. Pat. Nos. 3,024,237; 3,087,936; 3,172,982; 3,215,707; 3,219,666; 3,231,587; 3,245,910; 3,254,025; 3,271,310; 3,272,743; 3,272,746; 3,278,550; 3,288,714; 3,307,928; 3,312,619; 3,341,542; 3,367,943; 3,373,111; 3,374,174; 3,381,022; 3,394,179; 3,454,607; 3,346,354; 3,470,098; 3,630,902; 3,652,616; 3,755,169; 3,868,330; 3,912,764; and 4,368,133. British Pat. Nos. 944,136; 1,085,903; 1,162,436; and 1,440,219. Canadian Pat. No. 956,397. These patents are incorporated herein by reference.

One procedure for preparing the hydrocarbyl-substituted carboxylic acids and anhydrides, and ester and amide derivatives is illustrated, in part, in U.S. Pat. No. 3,219,666. This procedure is conveniently designated as the "two-step procedure". It involves first chlorinating an olefin polymer until there is an average of at least about one chloro group for each molecular weight of olefin polymer. (For purposes of this invention, the molecular weight of the olefin polymer is the weight corresponding to the Mn value.) Chorination involves merely contacting the olefin polymer with chlorine gas until the desired amount of chlorine is incorporated into the chlorinated polyolefin. Chlorination is generally carried out at a temperature of about 75° C. to about 125° C. If a diluent is used in the chlorination procedure, it should be one which is not itself readily subject to further chlorination. Poly- and perchlorinated and/or fluorinated alkanes and benzenes are examples of suitable diluents.

The second step in the two-step chlorination procedure is to react the chlorinated polyolefin with the alpha-beta olefinically unsaturated carboxylic acid reagent at a temperature usually within the range of about 100° C. to about 200° C. The mole ratio of chlorinated polyolefin to carboxylic acid reagent is usually about 1:1. (For purposes of this invention, one mole of a chlorinated polyolefin has the molecular weight of a chlorinated polyolefin corresponding to the Mn value of the unchlorinated polyolefin.) However, a stoichiometric excess of carboxylic acid reagent can be used, for example, a mole ratio of 1:2. If an average of more than about one chloro group per molecule of polyolefin is introduced during the chlorination step, then more than one mole of carboxylic acid reagent can react per mole of chlorinated polyalkene. Because of such situations, it is better to describe the ratio of chlorinated polyolefin to carboxylic acid reagent in terms of equivalents. (An equivalent weight of chlorinated polyolefin, for purposes of this invention, is the weight corresponding to the Mn value divided by the average number of chloro groups per molecule of chlorinated polyolefin. An equivalent weight of a carboxylic acid reagent is its molecular weight.) Thus, the ratio of chlorinated polyolefin to carboxylic acid reagent will normally be such as to provide about one equivalent of carboxylic acid reagent for each mole of chlorinated polyolefin up to about one equivalent of carboxylic acid reagent for each equivalent of chlorinated polyolefin with the understanding that it is normally desirable to provide an excess of carboxylic acid reagent; for example, an excess of about 5% to about 25% by weight. Unreacted excess carboxylic acid reagent may be stripped from the reaction product, usually under vacuum, or reacted during a further stage of the process as explained below.

The resulting polyolefin-substituted carboxylic acid or anhydride, or ester or amide derivative, is, optionally, again chlorinated if the desired number of carboxylic groups are not present in the product. If there is present, at the time of this subsequent chlorination, any excess carboxylic acid reagent from the second step, the excess will react as additional chlorine is introduced during the subsequent chlorination. Otherwise, additional carboxylic acid reagent is introduced during and/or subsequent to the additional chlorination step. This technique can be repeated until the total number of carboxylic groups per equivalent weight of substituent groups reaches the desired level.

Another procedure for preparing hydrocarbyl-substituted carboxylic acids and derivatives of the invention utilizes a process described in U.S. Pat. No. 3,912,764 and U.K. Pat. No. 1,440,219. Both of these patents are incorporated herein by reference. According to this procedure, the polyolefin and the carboxylic acid reagent are first reacted by heating them together in a direct alkylation procedure. When the direct alkylation step is completed, chlorine is introduced into the reaction mixture to promote reaction of the remaining unreacted carboxylic acid reagent. According to these patents, 0.3 to 2 or more moles of carboxylic acid reagent are used in the reaction for each mole of olefin polymer. The direct alkylation step is conducted at temperatures of about 180° C. to about 250° C. During the chlorine-introducing stage, a temperature of about 160° C. to about 225° C. is employed.

A preferred process for preparing the hydrocarbyl-substituted carboxylic acids and derivatives of this invention, is the so-called "one-step" process. This process is described in U.S. Pat. Nos. 3,215,707 and 3,231,587. Both of these patents are incorporated herein by reference. Basically, the one-step process involves preparing a mixture of the polyolefin and the carboxylic acid reagent containing the necessary amounts of both to provide the desired hydrocarbyl-substituted carboxylic acids or derivatives of this invention. Chlorine is then introduced into the mixture, usually by passing chlorine gas through the mixture with agitation, while maintaining the mixture at a temperature of at least about 140° C. A variation on this process involves adding additional carboxylic acid reagent during or subsequent to the chlorine introduction. Usually where the polyolefin is sufficiently fluid at 140° C. and above, there is no need to utilize an additional substantially inert, normally liquid solvent/diluent in the one-step process. However, as explained hereinbefore, if a solvent/diluent is employed, it is preferably one that resists chlorination. Again, the poly- and perchlorinated and-/or -fluorinated alkanes, cycloalkanes, and benzenes can be used for this purpose.

Chlorine may be introduced continuously or intermittently during the one-step process. The rate of introduction of the chlorine is not critical although, for maximum utilization of the chlorine, the rate should be about the same as the rate of consumption of chlorine in the course of the reaction. When the introduction rate of chlorine exceeds the rate of consumption, chlorine is evolved from the reaction mixture. It is often advantageous to use a closed system, including superatmospheric pressure, in order to prevent loss of chlorine so as to maximize chlorine utilization.

The maximum temperature at which the reaction in the one-step process takes place at a reasonable rate is about 140° C. Thus, the minimum temperature at which the process is normally carried out is in the neighborhood of 140° C. A preferred temperature range is between about 160° C. and about 220° C. Higher temperatures such as 250° C. or even higher may be used but usually with little advantage. In fact, temperatures in excess of 220° C. are often disadvantageous because they tend to "crack" the polyolefins (that is, reduce their molecular weight by thermal degradation) and/or decompose the carboxylic acid reagent. For this reason, maximum temperatures of about 200° C. to about 210° C. are normally not exceeded. The upper limit of the useful temperature in the one-step process is determined primarily by the decomposition point of the components in the reaction mixture including the reactants and the desired products. The decomposition point is that temperature at which there is sufficient decomposition of any reactant or product such as to interfere with the production of the desired products.

In the one-step process, the molar ratio of carboxylic acid reagent to chlorine is such that there is at least about one mole of chlorine for each mole of carboxylic acid reagent to be incorporated into the product. Moreover, for practical reasons, a slight excess, usually in the neighborhood of about 5% to about 30% by weight of chlorine, is utilized in order to offset any loss of chlorine from the reaction mixture. Larger amounts of excess chlorine may be used but do not appear to produce any beneficial results.

The Alcohols Useful In Making the Hydrocarbyl-Substituted Carboxylic Acid Ester Derivatives (C) (I)

The alcohols useful in making the hydrocarbyl-substituted carboxylic acid ester derivatives (C) (I) of this invention include those compounds of the general formula:

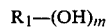

$$R_1-(OH)_m$$

wherein $R_1$ is a monovalent or polyvalent organic group joined to the —OH groups through carbon-to-oxygen bonds (that is, —COH wherein the carbon is not part of a carbonyl group) and m is an integer of from 1 to about 10, preferably 2 to about 6. These alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for the polyoxyalkylene alcohols, the mono- and polyhydric alcohols corresponding to the formula $(R_1-(OH)_m$ preferably contain not more than about 40 carbon atoms, more preferably not more than about 20 carbon atoms. The alcohols may contain non-hydrocarbon substituents or groups which do not interfere with the reaction of the alcohols with the hydrocarbyl-substituted carboxylic acids or anhydrides of this invention. Such non-hydrocarbon substituents or groups include lower alkoxy, lower alkyl, mercapto, nitro, and interrupting groups such as —O— and —S— (e.g., as in such groups as —CH$_2$CH$_2$—X—CH$_2$CH$_2$— where X is —O— or —S—).

Among the polyoxyalkylene alcohols suitable for use in the preparation of the ester derivatives of this invention are the commercially available polyoxyalkylene alcohols that include the polyoxyethylated amines, amides, and quaternary salts available from Armour Industrial Chemical Co. under the names ETHODUOMEEN polyethoxylated high-molecular-weight aliphatic diamines; ETHOMEEN, polyethoxylated aliphatic amines containing alkyl groups in the range of about 8 to about 18 carbon atoms; ETHOMID, polyethoxylated high-molecular-weight amides; and ETHOQUAD, polyethoxylated quaternary ammonium chlorides derived from long-chain amines.

Useful polyoxyalkylene alcohols and derivatives thereof include the hydrocarbyl ethers and the carboxylic acid esters obtained by reacting the alcohols with various carboxylic acids. Illustrative hydrocarbyl groups are alkyl, cycloalkyl, alkylaryl, aralkyl, alkylaryl alkyl, etc., containing up to about 40 carbon atoms. Specific hydrocarbyl groups include methyl, butyl, dodecyl, tolyl, phenyl, naphthyl, dodecylphenyl, p-octylphenyl ethyl, cyclohexyl, and the like. Carboxylic acids useful in preparing the ester derivatives are mono- or polycarboxylic acids such as acetic acid, valeric acid, lauric acid, stearic acid, succinic acid, and alkyl or alkenyl-substituted succinic acids wherein the alkyl or alkenyl group contains up to about 20 carbon atoms. Members of this class of alcohols are commercially available from various sources; e.g., PLURONICS, polyols available from Wyandotte Chemicals Corporation; POLYGLYCOL 112-2, a liquid triol derived from ethyleneoxide and propyleneoxide available from Dow Chemical Co., and TERGITOLS, dodecylphenyl or nonylphenyl polyethylene glycol ethers, and UCONS, polyalkylene glycols and various derivatives thereof, both available from Union Carbide Corporation. However, the alcohols used must have an average of at least one free alcoholic hydroxyl group per molecule of polyoxyalkylene alcohol. For purposes of describing these polyoxyalkylene alcohols, an alcoholic hydroxyl groups is one attached to a carbon atom that does not form part of an aromatic nucleus.

Alcohols useful in this invention also include alkylene glycols and polyoxyalkylene alcohols such as polyoxyethylene alcohols, polyoxypropylene alcohols, polyoxybutylene alcohols, and the like. These polyoxyalkylene alcohols (sometimes called polyglycols) can contain up to about 150 oxyalkylene groups, with the alkylene group containing from about 2 to about 8 carbon atoms. Such polyoxyalkylene alcohols are generally dihydric alcohols. That is, each end of the molecule terminates with an OH group. In order for such polyoxyalkylene alcohols to be useful, there must be at least one such OH group. However, the remaining OH group can be esterified with a monobasic, aliphatic or aromatic carboxylic acid of up to about 20 carbon atoms such as acetic acid, propionic acid, oleic acid, stearic acid, benzoic acid, and the like. The monoethers of these alkylene glycols and polyoxyalkylene glycols are also useful. These include the monoaryl ethers, monoalkyl ethers, and monoaralkyl ethers of these alkylene glycols and polyoxyalkylene glycols. This group of alcohols can be represented by the formula

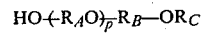

wherein $R_A$ and $R_B$ are independently alkylene groups of form about 2 to 8 carbon atoms; and $R_C$ is aryl (e.g., phenyl), lower alkoxy phenyl, or lower alkyl phenyl, or lower alkyl (e.g., ethyl, propyl, terbutyl, pentyl, etc.); and aralkyl (e.g., benzyl, phenylethyl, phenylpropyl, p-ethylphenylethyl, etc.); p is from zero to about eight, preferably from about 2 to 4. Polyoxyalkylene glycols where the alkylene groups are ethylene or propylene and p is at least two as well as the monoethers thereof as described above are useful.

The monohydric and polyhydric alcohols useful in this invention include monohydroxy and polyhydroxy aromatic compounds. Monohydric and polyhydric phenols and naphthols are preferred hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain from 1 to about 4 hydroxy groups. The aromatic hydroxy compounds are illustrated by the following specific examples: phenol, p-chlorophenol, p-nitrophenol, beta-naphthol, alpha-naphthol, cresols, resorcinol, catechol, carvacrol, thymol, eugenol, p,p'-dihydroxy-biphenyl, hydroquinone, pyrogallol, phloroglucinol, hexylresorcinol, orcin, quaiacol, 2-chlorophenol, 2,4-dibutylphenol, propenetetramer-substituted phenol, didodecylphenol, 4,4'-methylene-bis-methylene-bis-phenol, alpha-decyl-betanaphthol, polyisobutenyl-(molecular weight of about 1000)-substituted phenol, the condensation product of heptylphenol with about 0.5 mole of formaldehyde, the condensation product of octylphenol with acetone, di(hydroxyphenyl)oxide, di-(hydroxyphenyl)-sulfide, di(hydroxyphenyl)-disulfide, and 4-cyclohexylphenol. Phenol itself and aliphatic hydrocarbon-substituted phenols, e.g., alkylated phenols having up to 3 aliphatic hydrocarbon substituents are useful. Each of the aliphatic hydrocarbon substituents may contain about 100 or more carbon atoms but usually will have from 1 to about 20 carbon atoms. Alkyl and alkenyl groups are the preferred aliphatic hydrocarbon substituents.

Further specific examples of monohydric alcohols which can be used include monohydric alcohols such as methanol, ethanol, isooctanol, dodecanol, cyclohexanol, cyclopentanol, behenyl alcohol, hexatriacontanol, neopentyl alcohol, isobutyl alcohol, benzyl alcohol, beta-phenylethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, sec-pentyl alcohol, tertbutyl alcohol, 5-bromo-dodecanol, nitro-octadecanol, and dioleate of glycerol. Alcohols useful in this invention may be unsaturated alcohols such as allyl alcohol, cinnamyl alcohol, 1-cyclohexene-3-ol and oleyl alcohol.

Other specific alcohols useful in this invention are the ether alcohols and amino alcohols including, for example, the oxyalkylene-, oxyarylene-, amino-alkylene-, and amino-arylene-substituted alcohols having one or more oxyalkylene, aminoalkylene or aminoaryleneoxy-arylene groups. These alcohols are exemplified by the Cellosolves, (products of Union Carbide identified as mono- and dialkyl ethers of ethylene glycol and their derivatives), the Carbitols (products of Union Carbide identified as mono- and dialkyl ethers of diethylene glycol and their derivatives), phenoxyethanol, heptylphenyl-(oxypropylene)6-OH, octyl-(oxyethylene)30-OH, phenyl(oxyoctylene)2-OH, mono-(heptylphenyloxypropylene)-substituted glycerol, poly(-styreneoxide), aminoethanol, 3-aminoethylpentanol, di(hydroxyethyl)amine, p-aminophenol, tri(hydroxypropyl)amine, N-hydroxyethyl ethylenediamine, N,N,N',N'-tetrahydroxytrimethylenediamine, and the like.

The polyhydric alcohols preferably contain from 2 to about 10 hydroxy groups. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene groups contain from 2 to about 8 carbon atoms.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, and so forth likewise can be used. The carbohydrates may be exemplified by glucose, fructose, sucrose, rhamose, mannose, glyceraldehyde, and galactose.

Polyhydric alcohols having at least 3 hydroxyl groups, some, but not all of which have been esterified with an aliphatic monocarboxylic acid having from about 8 to about 30 carbon atoms such as octanoic acid, oleic acid, stearic acid, linoleic acid, dodecanoic acid or tall oil acid are useful. Further specific examples of such partially esterified polyhydric alcohols are the monooleate of sorbitol, distearate of sorbitol, monooleate of glycerol, monostearate of glycerol, di-dodecanoate of erythritol, and the like.

Useful alcohols also include those polyhydric alcohols containing up to about 12 carbon atoms, and especially those containing from about 3 to about 10 carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis-(hydroxymethyl)cyclohexanol, 1,10-decanediol, digitalose, and the like. Aliphatic alcohols containing at least about 3 hydroxyl groups and up to about 10 carbon atoms are useful.

Useful polyhydric alcohols are the polyhydric alkanols containing from about 3 to about 10 carbon atoms and particularly, those containing about 3 to about 6 carbon atoms and having at least three hydroxyl groups. Such alcohols are exemplified by glycerol, erythritol, pentaerythritol, mannitol, sorbitol, 2-hydroxymethyl-2-methyl-1,3-pro-panediol-(trimethylolethane), 2-hydroxymethyl-2-ethyl-1,3-propanediol(trimethylopropane), 1,2,4-hexanetriol, and the like.

Many issued patents disclose procedures for reacting carboxylic acid acylating agents with alcohols to produce acidic esters and neutral esters. These same techniques are applicable to preparing esters from the hydrocarbyl-substituted carboxylic acids and/or anhydrides thereof of this invention and the alcohols described above. All that is required is that the acid and/or anhydride, of this invention is substituted for the carboxylic acid acylating reagents discussed in these patents, usually on an equivalent weight basis. The following U.S. patents are expressly incorporated herein by references for their disclosure of suitable methods for reacting the acids and/or anhydrides of this invention with the alcohols described above: U.S. Pat. Nos. 3,331,776; 3,381,022; 3,522,179; 3,542,680; 3,697,428; and 3,755,169.

The Amines Useful In Making the Amide Derivatives (C) (I)

The amines useful in making the hydrocarbyl-substituted acid amide derivatives (C) (I) include ammonia and the primary amines or secondary amines, with the secondary amines being preferred. These amines are characterized by the presence with their structure of at least one H—N< group and/or at least one —NH$_2$ group. These amines can be monoamines or polyamines. Hydrazine and substituted hydrazines containing up to three substituents are included as amines suitable for preparing the derivatives (C) (I). Mixtures of two or more amines can be used.

The amines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These amines may be saturated or unsaturated. If unsaturated, the amine is preferably free from acetylenic unsaturation. The amines may also contain non-hydrocarbon substituents or groups as long as these groups do not significantly interfere with the reaction of the amines with the hydrocarbyl-substituted carboxylic acids and derivatives thereof of this invention. Such non-hydrocarbon substituents or groups include lower alkoxy, lower alkyl, mercapto, nitro, and interrupting groups such as —O— and —S— (e.g., as in such groups as —CH$_2$CH$_2$—X— CH$_2$CH$_2$— where X is —O— or —S—).

With the exception of the branched polyalkylene polyamines, the polyoxyalkylene polyamines and the high molecular weight hydrocarbyl-substituted amines described more fully hereinafter, the amines used in this invention ordinarily contain less than about 40 carbon atoms in total and usually not more than about 20 carbon atoms in total.

Aliphatic monoamines include mono-aliphatic and di-aliphatic-substituted amines wherein the aliphatic groups can be saturated or unsaturated and straight or branched chain. Thus, they are primary or secondary aliphatic amines. Such amines include, for example, mono- and di-alkyl-substituted amines, mono- and di-alkenyl-substituted amines, and amines having one N-alkenyl substituent and one N-alkyl substituent, and the like. The total number of carbon atoms in these aliphatic monoamines preferably does not exceed about 40 and usually does not exceed about 20 carbon atoms. Specific examples of such monoamines include ethylamine, diethylamine, n-butylamine, di-n-butylamine, allylamine, isobutylamine, cocoamine, stearylamine, laurylamine, methyllaurylamine, oleylamine, N-methyl-octylamine, dodecylamine, octadecylamine, and the like. Examples of cycloaliphatic-substituted aliphatic amines, aromatic-substituted aliphatic amines, and heterocyclic-substituted aliphatic amines, include 2-(cyclohexyl)-ethylamine, benzylamine, phenylethylamine, and 3-(furylpropyl)amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamines, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines and pyranyl-substituted cyclohexylamine.

Suitable aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthylene. Examples of aromatic monoamines include aniline, di(-para-methylphenyl)amine, naphthylamine, N-(n-butyl)aniline, and the like. Examples of aliphatic-substituted, cycloaliphatic-substituted, and heterocyclic-substituted aromatic monoamines include para-ethoxyaniline, paradodecylamine, cyclohexyl-substituted naphthylamine and thienyl-substituted aniline.

Suitable polyamines include aliphatic, cycloaliphatic and aromatic polyamines analogous to the above-described monoamines except for the presence within their structure of another amino nitrogen. The other amino nitrogen can be a primary, secondary or tertiary amino nitrogen. Examples of such polyamines include N-aminopropyl-cyclohexylamine, N-N'-di-n-butylparaphenylene diamine, bis-(para-aminophenyl)-methane, 1,4-diaminocyclohexane, and the like.

Heterocyclic mono- and polyamines can also be used in making the hydrocarbyl-substituted carboxylic acid amide derivatives (C) (I). As used herein, the terminology "heterocyclic mono- and polyamine(s)" is intended to describe those heterocyclic amines containing at least one primary or secondary amino group and at least one nitrogen as a heteroatom in the heterocyclic ring. However, as long as there is present in the heterocyclic mono- and polyamines at least one primary or secondary amino group, the hetero-N atom in the ring can be a tertiary amino nitrogen; that is, one that does not have hydrogen attached directly to the ring nitrogen. Heterocyclic amines can be saturated or unsaturated and can contain various substituents such as nitro, alkoxy, alkyl mercapto, alkyl, alkenyl, aryl, alkaryl, or aralkyl substituents. Generally, the total number of carbon atoms in the substituents will not exceed about 20. Heterocyclic amines can contain heteroatoms other than nitrogen, especially oxygen and sulfur. Obviously they can contain more than one nitrogen heteroatom. The 5- and 6-membered heterocyclic rings are preferred.

Among the suitable heterocyclics are aziridines, azetidines, azolidines, tetra- and di-hydro pyridines, pyrroles, indoles, piperadines, imidazoles, di- and tetra-hydroimidazoles, piperazines, isoindoles, purines, morpholines, thiomorpholines, N-aminoalkylmorpholines, N-aminoalkylthiomorpholines, N-aminoalkylpiperazines, N,N'-di-aminoalkylpiperazines, azepines, azocines, azonines, azecines and tetra-, di- and perhydro-derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are useful. Usually the aminoalkyl substituents are substituted on a nitrogen atom forming part of the hetero ring. Specific examples of such heterocyclic amines include N-aminopropylmorpholine, N-aminoethylpiperazine, and N,N'-di-aminoethylpiperazine.

Hydroxyamines both mono- and polyamines, analogous to those described above are also useful provided they contain at least one primary or secondary amino group. Hydroxy-substituted amines having only tertiary amino nitrogens, such as in trihydroxyethyl amine, are thus excluded as amines, but can be used as alcohols as disclosed above. The hydroxy-substituted amines contemplated are those having hydroxy substituents bonded directly to a carbon atom other than a carbonyl carbon atom; that is, they have hydroxy groups capable of functioning as alcohols. Examples of such hydroxy-substituted amines include ethanolamine, di(3-hydroxypropyl)-amine, 3-hydroxybutylamine, 4-hydroxybutylamine, diethanolamine, di(2-hydroxypropyl)amine, N-hydroxypropyl propylamine, N-(2-hydroxyethyl)cyclohexylamine, 3-hydroxycyclopentylamine, parahydroxyaniline, N-hydroxyethyl piperazine, and the like.

The terms hydroxyamine and aminoalcohol describe the same class of compounds and, therefore, can be used interchangeably.

Also suitable as amines are the aminosulfonic acids and derivatives thereof corresponding to the formula:

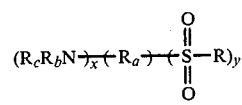

wherein R is OH, NH$_2$, ONH$_4$, etc.; R$_a$ is a polyvalent organic group having a valence equal to x+y; R$_b$ and R$_c$ are each independently hydrogen, hydrocarbyl or substituted hydrocarbyl with the proviso that at least one of R$_b$ and R$_c$ is hydrogen per aminosulfonic acid molecule; x and y are each integers equal to or greater than one. Each aminosulfonic reactant is characterized by at least one HN< or H₂N— group and at least one

group. These sulfonic acids can be aliphatic, cycloaliphatic or aromatic aminosulfonic acids and the corresponding functional derivatives of the sulfo group. Specifically, the aminosulfonic acids can be aromatic aminosulfonic acids, that is, where $R_a$ is a polyvalent aromatic group such as phenylene where at least one

group is attached directly to a nuclear carbon atom of the aromatic group. The aminosulfonic acid may also be a mono-amino aliphatic sulfonic acid; that is, an acid where x is one and $R_a$ is a polyvalent aliphatic group such as ethylene, propylene, trimethylene, and 2-methylene propylene. Other suitable aminosulfonic acids and derivatives thereof useful as amines in this invention are disclosed in U.S. Pat. Nos. 3,029,250; 3,367,864; and 3,926,820; which are incorporated herein by reference.

Hydrazine and substituted-hydrazine can also be used as amines in this invention. At least one of the nitrogens in the hydrazine must contain a hydrogen directly bonded thereto. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethylhydrazine, N,N'-dimethylhydrazine, phenylhydrazine, N-phenyl-N'-ethylhydrazine, N-(para-tolyl)-N'-(n-butyl)-hydrazine, N-(para-nitrophenyl)-hydrazine, N-(para-nitrophenyl)-N-methylhydrazine, N,N'-di-(parachlorophenol)-hydrazine, N-phenyl-N'-cyclohexylhydrazine, and the like.

The high molecular weight hydrocarbyl amines, both monoamines and polyamines, which can be used as amines in this invention are generally prepared by reacting a chlorinated polyolefin having a molecular weight of at least about 400 with ammonia or an amine. The amines that can be used are known in the art and described, for example, in U.S. Pat. Nos. 3,275,554 and 3,438,757, both of which are incorporated herein by reference. These amines must possess at least one primary or secondary amino group.

Another group of amines suitable for use in this invention are branched polyalkylene polyamines. The branched polyalkylene polyamines are polyalkylene polyamines wherein the branched group is a side chain containing on the average at least one nitrogen-bonded aminoalkylene

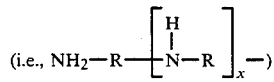

group per nine amino units present on the main chain; for example, 1-4 of such branched chains per nine units on the main chain, but preferably one side chain unit per nine main chain units. Thus, these polyamines contain at least three primary amino groups and at least one tertiary amino group. These amines may be expressed by the formula:

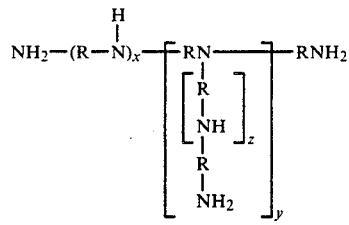

wherein R is an alkylene group such as ethylene, propylene, butylene and other homologs (both straight chained and branched), etc., but preferably ethylene; and x, y and z are integers; x is in the range of from about 4 to about 24 or more, preferably from about 6 to about 18; y is in the range of from 1 to about 6 or more, preferably from 1 to about 3; and z is in the range of from zero to about 6, preferably from zero to about 1. The x and y units may be sequential, alternative, orderly or randomly distributed. A useful class of such polyamines includes those of the formula:

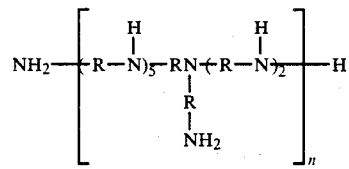

wherein n is an integer in the range of from 1 to about 20 or more, preferably in the range of from 1 to about 3, and R is preferably ethylene, but may be propylene, butylene, etc. (straight chained or branched). Useful embodiments are represented by the formula:

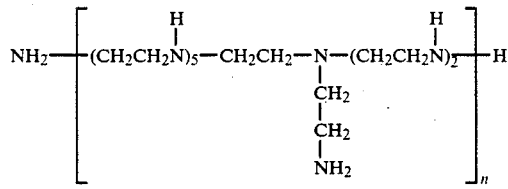

wherein n is an integer in the range of 1 to about 3. The groups within the brackets may be joined in a head-to-head or a head-to-tail fashion. U.S. Pat. Nos. 3,200,106 and 3,259,578 are incorporated herein by reference for their disclosures relative to said polyamines.

Suitable amines also include polyoxyalkylene polyamines, e.g., polyoxyalkylene diamines and polyoxyalkylene triamines, having average molecular weights ranging from about 200 to about 4000, preferably from about 400 to 2000. Examples of these polyoxyalkylene polyamines include those amines represented by the formula:

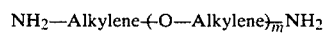

wherein m has a value of from about 3 to about 70, preferably from about 10 to about 35; and the formula:

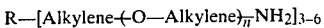

wherein n is a number in the range of from 1 to about 40, with the proviso that the sum of all of the n's is from about 3 to about 70 and generally from about 6 to about 35, and R is a polyvalent saturated hydrocarbyl group of up to about 10 carbon atoms having a valence of from about 3 to about 6. The alkylene groups may be straight or branched chains and contain from 1 to about 7 carbon atoms, and usually from 1 to about 4 carbon atoms. The various alkylene groups present within the above formulae may be the same or different.

More specific examples of these polyamines include:

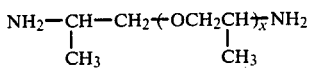

wherein x has a value of from about 3 to about 70, preferably from about 10 to 35; and

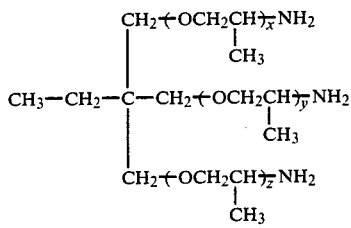

wherein $x+y+z$ have a total value ranging from about 3 to about 30, preferably from about 5 to about 10.

Useful polyoxyalkylene polyamines include the polyoxyethylene and polyoxypropylene diamines and the polyoxypropylene triamines having average molecular weights ranging from about 200 to about 2000. The polyoxyalkylene polyamines are commercially available from the Jefferson Chemical Company, Inc. under the trade name "Jeffamine". U.S. Pat. Nos. 3,804,763 and 3,948,800 are incorporated herein by reference for their disclosure of such polyoxyalkylene polyamines.

Useful amines are the alkylene polyamines, including the polyalkylene polyamines, as described in more detail hereafter. The alkylene polyamines include those conforming to the formula:

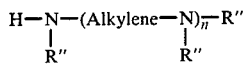

wherein n is from 1 to about 10; each R" is independently a hydrogen atom, a hydrocarbyl group or a hydroxy-substituted hydrocarbyl group having up to about 30 carbon atoms, and the "Alkylene" group has from about 1 to about 10 carbon atoms with the preferred alkylene being ethylene or propylene. Useful are the alkylene polyamines wherein each R" is hydrogen with the ethylene polyamines, and mixtures of ethylene polyamines being particularly preferred. Usually n will have an average value of from about 2 to about 7. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included.

Alkylene polyamines that are useful include ethylene diamine, triethylene tetramine, propylene diamine, trimethylene diamine, hexamethylene diamine, decamethylene diamine, octamethylene diamine, di(heptamethylene) triamine, tripropylene tetramine, tetraethylene pentamine, trimethylene diamine, pentaethylene hexamine, di(trimethylene) triamine, N-(2-aminoethyl) piperazine, 1,4-bis(2-aminoethyl) piperazine, and the like. Higher homologs as are obtained by condensing two or more of the above-illustrated alkylene amines are useful as amines in this invention as are mixtures of two or more of any of the afore-described polyamines.

Ethylene polyamines, such as those mentioned above, are described in detail under the heading "Diamines and Higher Amines" in The Encyclopedia of Chemical Technology, Second Edition, Kirk and Othmer, Volume 7, pages 27–39, Interscience Publishers, Division of John Wiley and Sons, 1965, these pages being incorporated herein by reference. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Hydroxyalkyl alkylene polyamines having one or more hydroxyalkyl substituents on the nitrogen atoms, are also useful in preparing compositions of the present invention. Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-(2-hydroxyethyl) ethylene diamine, N,N-bis(2-hydroxyethyl) ethylene diamine, 1-(2-hydroxyethyl)-piperazine, monohydroxypropyl-substituted diethylene triamine, dihydroxypropyl-substituted tetraethylene pentamine, N-(3-hydroxybutyl) tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

To prepare the hydrocarbyl-substituted carboxylic acid amide derivative (C) (I), one or more of each of the acid or anhydride (C) (I) and one or more of the above-described primary or secondary amines are mixed together and heated, optionally in the presence of a normally liquid, substantially inert organic liquid solvent/diluent, at temperatures in the range of from about 50° C. to about 130° C., preferably from about 80° C. to about 110° C. The acid or anhydride (C) (I) and the amine are reacted in amounts sufficient to provide from about 0.5 to about 3 equivalents of amine per equivalent of the acid or anhydride (C) (I). For purposes of this invention an equivalent of amine is that amount of the amine corresponding to the total weight of amine divided by the total number of nitrogens present. Thus, octylamine has an equivalent weight equal to its molecular weight; ethylene diamine has an equivalent weight equal to one-half its molecular weight; and aminoethylpiperazine has an equivalent weight equal to one-third its molecular weight. Also, for example, the equivalent weight of a commercially available mixture of polyalkylene polyamine can be determined by dividing the atomic weight of nitrogen (14) by the %N contained in the polyamine. Therefore, a polyamine mixture having a %N of 34 would have an equivalent weight of 41.2. The number of equivalents of the acid or anhydride (C) (I) depends on the total number of carboxylic functions (e.g., carboxylic acid or carboxylic acid anhydride groups) present in the acid or anhydride (C) (I). Thus, the number of equivalents of component (C) (I) will vary with the number of carboxy groups present therein. In determining the number of equivalents of the acid or anhydride (C) (I), those carboxyl functions which are not capable of reacting as a carboxylic acid acylating agent are excluded. In general, however, there is one equivalent of acid or anhydride (C) (I) for each carboxy group in component (C) (I). For example, there would be two equivalents in an anhydride derived from the reaction of one mole of olefin polymer and one mole of maleic anhydride. Conventional techniques are readily available for determining the number of carboxyl functions (e.g., acid number, saponification number) and, thus, the number of equivalents of acid or anhydride (C) (I) available to react with amine can be readily determined by one skilled in the art.

The Amines (C) (II)

The amines (C) (II) useful in preparing the salts (C) of the invention include ammonia and all of the primary and secondary amines discussed above as being useful in preparing the amide derivatives (C) (I). In addition to ammonia and the amines discussed above, the amines (C) (II) also include tertiary amines. The tertiary amines are analogous to the primary and secondary amines discussed above with the exception that hydrogen atoms in the H—N< or —NH$_2$ groups are replaced by hydrocarbyl groups. These tertiary amines can be monoamines or polyamines. The monoamines are represented by the formula

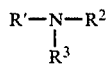

wherein R', R$^2$ and R$^3$ are the same or different hydrocarbyl groups. Preferably, R', R$^2$ and R$^3$ are independently hydrocarbyl groups of from 1 to about 20 carbon atoms. The tertiary amines can be symmetrical amines, dimethylalkyl amines or those derived from the reaction of a primary amine or a secondary amine with ethylene oxide. The tertiary amines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These tertiary amines may be saturated or unsaturated. If unsaturated, the amine is preferably free from acetylenic unsaturation (i.e., —C≡C—). The tertiary amines may also contain non-hydrocarbon substituents or groups as long as these groups do not significantly interfere with the reaction of the amines with the hydrocarbyl-substituted carboxylic acids and derivatives thereof (C) (I) of this invention. Such non-hydrocarbon substituents or groups include lower alkoxy, lower alkyl, mercapto, nitro, and interrupting groups such as —O— and —S— (e.g., as in such groups as —CH$_2$CH$_2$—X— CH$_2$CH$_2$— where X is —O— or —S—). Examples of such tertiary amines include trimethyl amine, triethyl amine, tripropyl amine, tributyl amine, monomethyldiethyl amine, monoethyldimethyl amine, dimethylpropyl amine, dimethylbutyl amine, dimethylpentyl amine, dimethylhexyl amine, dimethylheptyl amine, dimethyloctyl amine, dimethylnonyl amine, dimethyldecyl amine, dimethyldicodanyl amdne, dimetylphenyl amine, N,N-dioctyl-1-octanamine, N,N-didodecyl-1-dodecanamine tricoco amine, trihydrogenated-tallow amine, N-methyldihydrogenated tallow amine, N,N-dimethyl-1-dodecandmine, N,N-dimethyl-1-tetradecanamine, N,N-dimethyl-1-hexadecanamine, N,N-dimethyl-1-octadecanamine, N,N-dimethylcoco, amine, N,N-dimethyl soyaamine, N,N-dimetyl hydrogenated tallow amine, etc.

In a particularly advantageous embodiment the amines (C) (II) are hydroxyamines. These hydroxyamines can be primary, secondary, or tertiary amines. Typically, the hydroxyamines are primary, secondary or dertiary alkanol amines or mixtures thereof. Such amines can be represented, respectfully, by the formulae:

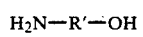

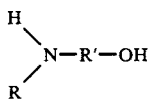

and

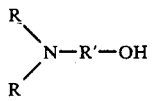

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The group —R'—OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to seven carbon atoms.

The hydroxyamines can also be an ether N-(hydroxy-substituted hydrocarbyl)amine. These are hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines can be conveniently prepared by reaction of epoxides with aforedescribed amines and can be represented by the formulae:

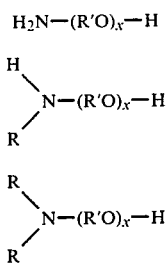

wherein x is a number from about 2 to about 15 and R and R' are as described above.

Polyamine analogs of thse hydroxy amines, particularly alkoxylated alkylene polyamines (e.g., N,N-(diethanol)-ethylene diamine) can also be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the afore-described primary, secondary or tertiary alkanol amines with ethylene, propylene or higher epoxides in a 1:1 to 1:2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

Examples of the N-(hydroxyl-substituted hydrocarbyl) amines include mono-, di-, and triethanol amine, diethylethanol amine, di-(3-hydroxyl propyl) amine, N-(3-hydroxyl butyl) amine, N-(4-hydroxyl butyl) amine, N,N-di-(2-hydroxyl propyl) amine, N-(2-hydroxyl ethyl) morpholine and its thio analog, N-(2-hydroxyl ethyl) cyclohexyl amine, N-3-hydroxyl cyclopentyl amine, o-, m- and p-aminophenol, N-(hydroxyl ethyl) piperazine, N,N'-di(hydroxyl ethyl) piperazine, and the like.

Further amino alcohols are the hydroxy-substituted primary amines described in U.S. Pat. No. 3,576,743 by the general formula

$R_a-NH_2$ wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a-NH_2$ wherein $R_a$ is a mono-O or polyhydroxy-substituted alkyl group. It is desirable that at least one of the hydroxyl groups be a primary alcoholic hydroxyl group. Specific examples of the hydroxy-substituted primary amines include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propanediol, 2-amino-2-ethyl-1,3-propanediol, N-(beta-hydroxypropyl)-N'-(beta-aminoethyl)-piperazine, tris-(hydroxymethyl) amino methane (also known as trismethylolamino methane), 2-amino-1-butanol, ethanolamine, beta-(beta-hydroxy ethoxy)-ethyl amine, glucamine, glusoamine, 4-amino-3-hydroxy-3-methyl-1-butene (which can be prepared according to procedures known in the art by reacting isopreneoxide with ammonia), N-3-(aminopropyl)-4-(2-hydroxyethyl)-piperadine, 2-amino-6-methyl-6-heptanol, 5-amino-1-pentanol, N-(beta-hydroxyethyl)-1,3-diamino propane, 1,3-diamino-2-hydroxypropane, N-(beta-hydroxy ethoxyethyl)-ethylenediamine, trismethylolaminomethane and the like. U.S. Pat. No. 3,576,743 is incorporated herein by reference.

Reaction Between the Hydrocarbyl-Substituted Acid or Anhydride, or Ester or Amide Derivative (C) (I) and the Amine (C) (II)

The product of the reaction between the hydrocarbyl-substituted carboxylic acid or anhydride, or ester or amide derivative (C) (I), and the amine (C) (II) comprises at least one salt (C). This salt can be an internal salt involving residues of a molecule of the hydrocarbyl-substituted carboxylic acid or anhydride, or ester or amide derivative (C) (I), and the amine (C) (II), wherein one of the carboxyl groups becomes ionically bound to a nitrogen atom within the same group; or it may be an external salt wherein the ionic salt group is formed with a nitrogen atom which is not part of the same molecule. The product of the reaction between components (C) (I) and (C) (II) can also include other compounds such as imides, amides, esters, and the like, but at least some salt must be present for component (C) to be useful in accordance with the invention. In a preferred embodiment the amine (C) (II) is a hydroxyamine, and the product of the reaction between components (C) (I) and (C) (II) is half ester and half salt, i.e., an ester/salt.

The reaction between components (C) (I) and (C) (II) is carried out under conditions that provide for the formation of the desired salt. Typically, one or more of components (C) (I) and one or more of components (C) (II) are mixed together and heated to a temperature in the range of from about 50° C. to about 130° C., preferably from about 80° C. to about 110° C.; optionally, in the presence of a normally liquid, substantially inert organic liquid solvent/diluent, until the desired product has formed. Components (C) (I) and (C) (II) are reacted in amounts sufficient to provide from about 0.5 to about 3 equivalents of component (C) (II) per equivalent of component (C) (I).

The following examples disclose exemplary preparations of nitrogen-containing salt emulsifiers (C) which are useful in water-in-oil emulsions of the invention. Unless otherwise indicated, in the following examples as well as throughout the entire specification and in the appended claims, all parts and percentages are by weight, and all temperatures are in degrees centigrade.

EXAMPLE 1

2240 parts of polyisobutylene (Mn=950) substituted succinic anhydride are heated to a temperature in the range of 110°–116° C. 174 parts of morpholine are then added dropwise to the anhydride. After completion of the addition of morpholine, the resulting mixture is maintained at a temperature of 116°–126° C. for two hours. 234 parts of diethylethanolamine are then added dropwise while the temperature is maintained at 116°–126° C. After completion of the addition of diethylethanolamine, the resulting mixture is maintained at 116°–126° C. for 50 minutes with stirring. The resulting product is an amide/salt.

EXAMPLE 2

A mixture of 1100 parts of the polyisobutylene-substituted succinic anhydride used in Example 1 and 100 parts of Carbowax 200 (a product of Union Carbide identified as a polyethylene glycol having a molecular weight of 200) are heated to and then maintained at a temperature of 123°–134° C., maintained at said temperature for 2 hours, then cooled to 100° C. 117 parts of diethylethanolamine are added to the resulting product over a 0.2 hour period while maintaining the temperature at 100° C. The mixture is then cooled to room temperature. The product is an ester/salt.

EXAMPLE 3

A mixture of 1100 parts of the polyisobutylene-substituted succinic anhydride used in Example 1 and 34 parts of pentaerythritol are heated to a temperature of 125°–160° C., maintained at said temperature for 4 hours, then adjusted to 130° C. 117 parts of diethylethanolamine are added to the mixture. The temperature is maintained at 100°–130° C. for 1 hour. The resulting product is then cooled to room temperature. The product is an ester/salt.

EXAMPLE 4

A mixture of 2240 parts of the polyisobutylene-substituted succinic anhydride used in Example 1 and 300 parts of a 40 SUS mineral seal oil are heated to 50° C. with continuous stirring over a 0.5-hour period. 54 parts of tap water are added and the resulting mixture is heated from 50° C. to 92° C. over a 0.5-hour period, then maintained at 92°–98° C. for 5 hours. 244 parts of monoethanolamine are added and the resulting mixture is maintained at 92°–98° C. The product is a di-salt.

EXAMPLE 5

A mixture of 2240 parts of the polyisobutylene-substituted succinic anhydride used in Example 1 and 62 parts of ethylene glycol are heated to a temperature in the range of 116°–120° C., then maintained at said temperature for 5 hours. The temperature of the mixture is then increased to a temperature in the range of 138°–146° C. and maintained at said increased temperature for an additional 4.5 hours. The temperature of the mixture is then decreased to 115° C. over a period of 0.5 hour. 122 parts of monoethanolamine are added to the mixture over a period of 0.5 hour while maintaining the temperature at 115°–120° C. The mixture is then stirred for an additional 0.5 hour while maintaining the temperature at 115°–120° C. The resulting product is an ester/salt.

EXAMPLE 6

2895 parts of polyisobutylene (Mn=1700) substituted succinic anhydride are heated to 121° C. over a 1-hour period. 605 parts of diethylethanolamine are added dropwise over a 2-hour period while maintaining the temperature of the mixture at 121°–128° C. The mixture is maintained at 121°–123° C. for an additional hour, and then cooled to 50° C. to provide the desired product. The product is an ester/salt.

EXAMPLE 7

A mixture of 1000 parts of the polyisobutylene-substituted succinic anhydride used in Example 1 and 337 parts of a blend oil are heated to 85° C. 26 parts of tap water are added to the mixture. The mixture is heated to 102° C. over a period of 0.25 hour. The mixture is maintained at a temperature of 102°–105° C. for 4 hours, and then cooled to 70° C. 209 parts of diethylethanolamine are added to the mixture over a 0.2-hour period, and the mixture exotherms to 79° C. The mixture is then maintained at a temperature of 78°–79° C. for 1.5 hours and then cooled to provide the desired product. The product is a di-salt.

EXAMPLE 8

1120 parts of the polyisobutylene-substituted succinic anhydride used in Example 1 are heated to 85°–90° C. over a 1-hour period. 117 parts of diethylethanolamine are added dropwise over a 0.5-hour period. The resulting mixture is maintained at a temperature of 85°–90° C. for 4 hours, then cooled to room temperature to provide the desired product. The product is an internal salt.

EXAMPLE 9

A mixture of 917 parts of diluent oil, 40 parts of diatomaceous earth tilter aid, 10 parts of caustic soda, 0.2 part of a silicone-based anti-foam agent, 135 parts of 3-amino-1,2,4-triazole, and 6.67 parts of a commercial polyethylene polyamine mixture containing 33.5% nitrogen and substantially corresponding to tetraethylene pentamine are heated to a temperature of 121° C. with stirring. 1000 parts of the polyisobutylene-substituted succinic anhydride used in Example 1 are slowly added to the mixture over a period of about one hour, and during such addition the temperature of the mixture is increased from 121° C. to 154° C. The mixture is then maintained at a temperature of 154°–160° C. with nitrogen blowing for 12 hours. The mixture is then cooled to 138°–149° C. and filtered. A final oil adjustment is made to adjust the product to a 45% by weight diluent oil. The product contains a minor amount of salt.

EXAMPLE 10

6720 parts of the polyisobutenyl succinic anhydride used in Example 1 are heated to 90° C. with stirring. 702 parts of diethylethanolamine are added over a 1.5-hour period. This intermediate mixture is then heated for an additional 0.5 hour at 90° C. Then 366 parts of monoethanolamine are slowly added. The mixture is maintained at 90° C. for 0.5 hour and then cooled to provide a clear brown, viscous liquid product. The product is a mixture of imide and salt, with minor amounts of amide and ester being present.

EXAMPLE 11

2240 parts of the polyisobutenyl-substituted succinic anhydride used in Example 1 are heated to a temperature of about 90° C. 468 parts of diethylethanolamine are added over a 2-hour period. The mixture is heated for an additional hour at 90° C. to provide the desired product. The product is an ester/salt.

The Functional Additive (D)

The functional additive (D) can be any water-soluble, oil-insoluble functional additive that has utility in the inventive water-in-oil emulsions. Many such additives are known in the art. Typically these additives are organic or inorganic acids or salts. The phosphates, borates and molybdates are useful as such functional additives (D) when the inventive water-in-oil emulsions are, for example, hydraulic fluids. These additives function as rust-inhibiting agents and in some instances as anti-wear agents. Organic salts such as sodium-2-mercaptobenzothiazole are also useful as a rust-inhibiting agent. Non-oxidizing acids such as hydrochloric acid and sulfuric acid are useful as such additives when the inventive water-in-oil emulsions are, for example, acidizing fluids for use in enhanced oil recovery. Oxygen supplying salts such as ammonium nitrate are useful as such additives when the inventive water-in-oil emulsions are used as explosives.

Examples of the phosphates include any compound containing the group $PO\equiv 4$ including the normal or tertiary phosphates $(X_3PO_4)$; the monoacid, monohydric, dibasic or secondary phosphates $(X_2HPO_4)$; the diacid, dihydric, monobasic or primary phosphates $(XH_2PO_4)$; the double phosphates $((X,X')PO_4)$; the triple phosphates $((X,X',X'')PO_4)$; and the orthophosphates $(X_3PO_4)$; as well as the hypophosphates $(X_4P_2O_6)$; and the pyrophosphates $(X_4P_2O_7)$. In the above formulae X is a monovalent metal (e.g., sodium or potassium) or an ammonium group $(NH_4+)$. Specific examples of such phosphates include diammonium hydrogen phosphate, monoammonium phosphate, disodium phosphate, and monosodium phosphate. Salts formed by the reaction of monoethanolamine with phosphoric acid are useful.

The molybdates include $X_2(MoO_4)$, $X_2(Mo_2O_7)$ and $X_6Mo_7O_{24}$, wherein X is an ammonium group $(NH_4+)$, or a monovalent metal, (e.g., alkali metal, especially sodium or potassium). The salts of molybdic acid, $H_2MoO_4$, are useful. Similarly, the salts of hydrous molybdic acid, $MoO_4.4H_2O$, and molybdic anhydride $MoO_3$, are useful. Sodium molybdate, $Na_2MoO_4.2H_2O$, is a preferred molybdate.

The borates include $XH_2BO_3$ and $XH_3BO$, wherein X is $NH_4+$ or a monovalent metal such as sodium or potassium. The meta-borates, compounds containing the radical $-BO_2$; the orthoborates, compounds containing the radical $-BO_3$; and the pyroborates, compounds containing the radical $>B_4O_7$ are useful. Specific examples of useful borates include: sodium metaborate, $Na_2BO_2$; sodium borate tetrahydrate, $Na_2B_2O_4.4H_2O$; borax, $Na_2B_4O_7.10H_2O$; anhydrous borax, $Na_2B_4O_7$; sodium borate pentahydrate $Na_2B_4O_7.5H_2O$, and the like.

The non-oxidizing acids include inorganic acids such as hydrochloric acid, sulfuric acid, hydrofluoric acid, sulfamic acid, and the like, as well as organic acids containing from 1 to about 3 carbon atoms such as formic acid, acetic acid, propionic acid, and the like. Mixtures of two or more of the foregoing acids can be used. Hydrochloric acid is preferred.

The oxygen-supplying salts which are useful as the functional additive (D) include ammonium nitrate, and the alkali or alkaline earth metal nitrates, chlorates, perchlorates and mixtures thereof. Examples include sodium nitrate, sodium perchlorate and ammonium perchlorate. Ammonium nitrate is especially preferred.

Emulsion Stabilizers

Although the inventive emulsions are, in themselves useful, emulsion stablizers can be used to improve the stability of the emulsion against deterioration due to temperature, pressure, oxidation of the oil, and other harmful environments. Stabilizers include phosphatides, especially those having the structural formula

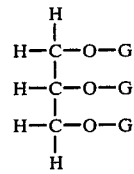

wherein G is selected from the class consisting of fatty acyl groups and phosphorus-containing groups having the structural grouping

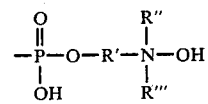

wherein R' is a lower alkylene group having from 1 to about 10 carbon atoms and R'' and R''' are lower alkyl groups having from 1 to 4 carbon atoms, and at least one but no more than two of the G groups being said phosphorus-containing group. The fatty acyl groups are for the most part those derived from fatty acids having from about 8 to about 30 carbon atoms in the fatty groups such as octanoic acid, stearic acid, oleic acid, palmitic acid, behenic acid, myristic acid, and oleostearic acid. Especially desirable groups are those derived from commercial fatty compounds such as soyabean oil, cotton seed oil, and castor oil. A particularly effective phosphatide is soyabean lecithin which is described in detail in Encyclopedia of Chemical Technology, Kirk and Othmer, Volume 8, pages 309–326 (1952), which is incorporated herein by reference.

The emulsion stabilizer may be an aliphatic glycol or a mono-aryl ether of an aliphatic glycol. The aliphatic glycol may be a polyalkylene glycol. It is preferably one in which the alkylene group is a lower alkylene group having from 1 to about 10 carbon atoms. Thus, the aliphatic glycol is illustrated by ethylene glycol, trimethylene glycol, propylene glycol, tetramethylene glycol, 1,2-butylene glycol, 2,3-butylene glycol, tetramethylene glycol, hexamethylene glycol, or the like. Specific examples of the ethers include monophenyl ether of ethylene glycol, mono-(heptylphenyl) ether of triethylene glycol, mono-(alpha-octyl-beta-naphthyl) ether of tetrapropylene glycol, mono-(polyisobutene(-molecular weight of 1000)-substituted phenyl) ether of octapropylene glycol, and mono-(o,p-dibutylphenyl) ether of polybutylene glycol, mono-(heptylphenyl) ether of trimethylene glycol and mono-(3,5-dioctylphenyl) ether of tetra-trimethylene glycol, etc. The mono-aryl ethers are obtained by the condensation of a phenolic compound such as an alkylated phenol or naphthyl with one or more moles of an epoxide such as ethylene oxide, propylene oxide, trimethylene oxide, or 2,3-hexalene oxide. The condensation is promoted by a basic catalyst such as an alkali or alkaline earth metal hydroxide, alcoholate, or phenate. The temperature at which the condensation is carried out may be varied within wide ranges such as from room temperature to about 250° C. Ordinarily it is preferably 50°-150° C. More than one mole of the epoxide may condense with the phenolic compound so that the product may contain in its molecular structure one or more of the groups derived from the epoxide. A polar-substituted alkylene oxide such as epichlorohydrin or epilbromohydrin likewise is useful to prepare the mono-aryl ether product and such product likewise is useful as the emulsion stabilizer in this invention.

Also useful as the emulsion stabilizers are the mono-alkyl ethers of the aliphatic glycols in which the alkyl group is, e.g., octyl, nonyl, dodecyl, behenyl, etc. The fatty acid esters of the mono-aryl or mono-alkyl ethers of aliphatic glycols also are useful. The fatty acids include, e.g., acetic acid, formic acid, butanoic acid, hexanoic acid, oleic acid, stearic acid, behenic acid, decanoic acid, iso-stearic acid, linoleic acid, as well as commercial acid mixtures such as are obtained by the hydrolysis of tall oils, sperm oils, etc. Specific examples are the oleate of mono-(heptylphenyl) ether of tetraethylene glycol and the acetate of mono-(polypropene(having molecular weight of 1000)-substituted phenyl) ether of tri-propylene glycol.

The alkali metal and ammonium salts of sulfonic acids likewise are useful emulsion stabilizers. The acids are illustrated by decylbenzene sulfonic acid, di-dodecyl-benzene sulfonic acid, mahogany sulfonic acid, heptyl-benzene sulfonic acid, polyisobutene sulfonic acid (molecular weight of 750), and decylnaphthalene sulfonic acid, and tri-decylbenzene sulfonic acid. The salts are illustrated by the sodium, potassium, or ammonium salts of the above acids.

Also useful as supplementary emulsion stabilizers are the neutral alkali metal salts of fatty acids having at least 12 aliphatic carbon atoms in the fatty group. These fatty acids include, principally, lauric acid, stearic acid, oleic acid, myristic acid, palmitic acid, linoleic acid, linolenic acid, behenic acid, or a mixture of such acids such as are obtained from the hydrolysis of tall oil, sperm oil, and other commercial fats. The acids should contain at least about 12 aliphatic carbon atoms, preferably from about 16 to about 30 carbon atoms.

Only a small amount of the stabilizer is necessary. It may be as little as 0.01 part and seldom exceeds 2 parts per 100 parts of the emulsion. Preferably, it is within the range from about 0.1 to about 1 part per 100 parts of the emulsion.

Hydraulic Fluids

When the inventive emulsions are employed as hydraulic fluids, such emulsions typically include other additional additives such as extreme pressure agents, rust-inhibiting agents in addition to those discussed above, foam inhibitors, freezing point depressants, bactericides, oxidation-inhibitors, and the like.

Extreme pressure agents are agents which improve the load-carrying properties of the emulsion. These agents are illustrated by lead or nickel or Group II metal phosphorodithioates in which the metal may be magnesium, calcium, barium, strontium, zinc, or cadmium. Zinc is an especially preferred metal. Specific examples of the metal phosphorodithioates include zinc di(4-methyl-2-pentyl) phosphorodithioate, zinc O-methyl-O'-dodecylphosphorodithioate, barium diheptylphosphorodithioate, barium di(n-butylphenyl) phosphorodithioate, magnesium di-cyclohexylphosphorodithioate, cadmium salt of an equal molar mixture of dimethylphosphorodithioic acid and di-octylphosphorodithioic acid, zinc di-n-nonylphosphorodithioate, zinc di-dodecylphosphorodithioate, lead di-pentyl phosphorodithioate, nickel di-octylphosphorodithioate, and zinc di-(heptylphenyl) phosphorodithioate.

Methods for preparing the phosphorodithioic acids are known in the art, including, for example, the reaction of an alcohol or a phenol with phosphorus pentasulfide. Likewise known are the methods for preparing the Group II metal salts of phosphorodithioic acids. Such methods are illustrated by the neutralization of phosphorodithioic acids or mixtures of such acids with zinc oxide.

Other extreme pressure agents useful in the emulsions of this invention include the chlorinated waxes; sulfurized or phosphosulfurized fatty acid esters; di- and tri-hydrocarbon phosphites and phosphates; di-hydrocarbon polysulfides; and metal dithiocarbamates. The chlorinated waxes are exemplified by chlorinated eicosane having a chlorine content of 50% or other chlorinated petroleum waxes having a chlorine content of 5-60%. The sulfurized fatty esters are obtained by the treatment of a lower alkyl ester of a fatty acid having at least about 12 carbon atoms with a sulfurizing agent such as sulfur, sulfur mono-chloride, sulfur dichloride, or the like. The fatty acid esters are illustrated by methyl oleate, methyl stearate, isopropyl myristate, cyclohexyl ester of tall oil acid, ethyl palmitate, isooctyl laurate, diester of ethylene glycol with stearic acid, etc. Commercial mixtures of esters likewise are useful. They include, for example, sperm oil, Menhaden oil, glycerol trioleate, etc. The sulfurization is effected most conveniently at temperatures between about 100° C. and about 250° C. More than one atom of sulfur can be incorprated into the ester and for the purpose of this invention sulfurized esters having as many as four or five atoms of sulfur per molecule are useful. Examples include sulfurized sperm oil having a sulfur content of 5%, sulfurized tall oil having a sulfur content of 9%, sulfurized methyl oleate having a sulfur content of 3%, and sulfurized stearyl stearate having a sulfur content of 15%.

The phosphosulfurized fatty acid esters are obtained by the treatment of the esters illustrated above with a phosphorus sulfide such as phosphorus pentasulfide, phosphorus sesquisulfide, or phosphorus heptasulfide. The treatment is illustrated by mixing an ester with from about 0.5% to 25% of a phosphorus sulfide at a temperature within the range from about 100° C. to about 250° C. The products contain both phosphorus and sulfur but the precise chemical structure of such products is not clearly understood.

The phosphites and phosphates useful herein are the di- and tri-esters of phosphorus or phosphoric acid in which the ester group is derived from a substantially hydrocarbon group including aryl, alkyl, alkaryl, arylalkyl, or cycloalkyl group as well as a hydrocarbon group having a polar substituent such as chloro, nitro, bromo, ether, or the like. Particularly desirable phosphites and phosphates are those in which the ester groups are phenyl, alkylphenyl or alkyl groups containing from about 6 to about 30 carbon atoms. Examples are dibutyl phosphite, diheptyl phosphite, dicylohexyl phosphite, di-(pentylphenyl) phosphite, bis-(dipentylphenyl) phosphite, tridecyl phosphite, di-stearyl phosphite, dimethyl naphthyl phosphite, oleyl 4-pentylphenyl phosphite, triphenyl phosphite, bis-(hexapropylene-substituted phenyl) phosphite, tri(n-chloro-3-heptylphenyl) phosphite, triphenyl phosphate, tricresyl phosphate, tri(p-chlorophenyl) phosphate, and triheptylphenyl) phosphate.

The metal dithiocarbamates include principally those of zinc, lead, strontium, nickel, cadmium, and palladium with N,N-dialkyldithiocarbamic acids in which the alkyl group contains from 3 to about 30 carbon atoms. Examples are zinc N,N-dioctyl dithiocarbamate, lead N,N-dicyclohexyl dithiocarbamate, cadmium N,N-dibehenyl dithiocarbamate, lead N,N-didodecyl dithiocarbamate, and mixtures thereof.

The concentration of the extreme pressure agent is usually within the range from about 0.05 to about 5 parts, although it is seldom necessary to employ more than 2 parts of this agent per 100 parts of the emulsion.

Another type of additive which finds use in the emulsion is a rust-inhibiting agent. The most effective rust-inhibiting agents in the emulsions of this invention are aliphatic amines, especially aliphatic primary amines having at least 8 carbon atoms in the molecule. The aliphatic amines are preferably tertiary-alkyl primary amines having from about 12 to about 30 carbon atoms. The amines include stearyl amine, oleyl amine, myristyl amine, palmityl amine, n-octyl amine, dodecyl amine, octadecyl amine, and other commercial primary amine mixtures such as the mixture in which the aliphatic group is a mixture of tertiary-alkyl group having from 11 to 14 carbon atoms and an average of 12 carbon atoms, and the mixture in which the aliphatic group is a mixture of tertiary-alkyl groups having from 18 to 24 carbon atoms.

Also effective as rust-inhibiting agents are the salts of an aromatic acid such as benzoic acid, toluic acid, naphthoic acid, phthalic acid, or terephthalic acid with any of the aliphatic amines listed above. Salts derived from other acids such as p-aminobenzoic acid and o-chlorobenzoic acid likewise are useful.

The salts of amines with the aromatic acids are prepared simply by mixing the reactants at a temperature below the dehydration temperature, i.e., below about 90° C. In most instances the reaction is exothermic and heating is not necessary. A solvent such as benzene, toluene, naphtha, and chlorobenzene may be used.

Still another class of rust-inhibiting agents are the hydroxy-alkyl amines, especially the long chain (i.e., $C_{8-30}$) aliphatic amines containing one or two hydroxyalkyl substituents on the amine nitrogen atom. Examples are N-(2-hydroxyethyl) octylamine, N,N-di-(2-hydroxy-1-propyl) dodecylamine, N-(3-hydroxy-1-pentyl) octadecylamine, and N,N-di-(2-hydroxy-3-butyl) decylamine.

Also useful as the rust-inhibiting agents are the nitrous acid salts of the long chain aliphatic amines illustrated above. Such salts are obtained simply by mixing at ordinary temperatures such as room temperature an amine with nitrous acid. Specific examples include the nitrous acid salt of the tertiary-alkyl ($C_{11-14}$) primary amine and the nitrous acid salt of octadecylamine.

The concentration of rust-inhibiting agent in the emulsion depends to some extent upon the relative concentration of water in the emulsion. Ordinarily from about 0.01 part to about 2 parts of a rust-inhibiting agent per 100 parts of the emulsion is sufficient.

Still another type of additive which finds use in these emulsions is a foam-inhibitor which may be a commercial dialkyl siloxane polymer or a polymer of an alkyl methacrylate. Freezing point depressants, i.e., water-soluble polyhydric alcohols such as glycerol or other polar substances such as Cellosolve are also useful. The concentration of these additives usually is less than 5 parts per 100 parts of the emulsion.

Bactericides are also useful in the emulsions of this invention. They are illustrated by nitro-bromoalkanes (such as 3-nitro-1-propyl bromide), nitrohydroxyalkanes (such as tri-(hydroxymethyl) nitromethane, 2-nitro-2-ethyl-1,3-propan-diol, and 2-nitro-1-butanol), and boric acid esters (such as glycerol borate). The concentration of the bactericide may be from about 0.001 to about 1 part per 100 parts of the emulsion.

Oxidation-inhibitors useful in the emulsions of this invention include the hindered phenols such as 2,4-di-tert-butyl-6-methylphenol, 4,4'-methylene(2,6-di-tert-pentylphenol), and 2,6-di-tert-octyl-4-sec-butylphenol. The concentration of the oxidation-inhibitors is usually 0.01 to 2 parts per 100 parts of the emulsion.

The emulsions can be prepared simply by mixing the oil (A), the water (B), the emulsifying salt (C), the functional additive (D), and any other ingredient which may be desirable, in a homogenizer or any other efficient blending device. Heating the emulsion during or after it is prepared is not necessary. The order of mixing of the ingredients is not critical, although it is convenient first to prepare an oil concentrate containing from about 50 to about 95% of the oil-soluble ingredients and from about 5 to about 50% of the oil and then to emulsify the concentrate with a water solution containing the functional additive (D) in appropriate proportions.

Illustrative water-in-oil hydraulic fluids within the scope of the invention are disclosed in Table I are in parts by weight.

TABLE I

|  | A | B |
|---|---|---|
| 100 N. Oil | 54.0 | 54.0 |
| Water | 40.0 | 40.0 |
| Product of Example 11 | 3.0 | 3.5 |
| (NH$_4$)$_2$HPO$_4$ | 0.5 | 0.5 |
| Commercially available zinc dithiophosphate | 1.5 | 2.0 |
| Commercially available overbased barium sulfonate | 1.0 | — |

Acidizing Fluids

When the inventive emulsions are employed as acidizing fluids, such emulsions can optionally contain one or more oil-soluble surfactants. These surfactants include anionic, cationic and nonionic surfactants. Suitable anionic surfactants include fatty acid soaps which are the salts of long chain fatty acids derived from naturally occurring fats and oils and salts of alkylbenzene sulfonic acids. A useful anionic surfactant is the morpholinium salt of tetracosanylbenzene sulfonic acid. The ammonium and alkali metal salts are also suitable. Cationic surfactants include amine salts such as polyoxyethylene amine as well as quaternary ammonium compounds. Useful cationic surfactants include high molecular weight alkyl imides and amides of polybasic amines. Suitable nonionic surfactants include derivatives of glycerides, glucosides, polyoxyethylene and polyoxypropylene. Typical nonionic surfactants include ethoxylated linear alcohols and ethoxylated alkyl phenols. Mixtures of surfactants can also be used. The acidizing fluids of the invention generally contain up to about 10% by weight, preferably from about 0.1% to about 2% by weight of the foregoing surfactants.

The acidizing fluids can be prepared simply by mixing the oil (A), the water (B), the emulsifying salt (C), the functional additive (D), and any other ingredient which may be desirable, in a homogenizer or any other efficient blending device. Heating the emulsion during or after it is prepared is not necessary. The order of mixing of the ingredients is not critical, although it is convenient first to prepare an oil concentrate containing from about 50 to about 95% of the oil-soluble ingredients and from about 5 to about 50% of the oil and then to emulsify the concentrate with a water solution containing the functional additive (D) in appropriate proportions.

Reference is herein made to U.S. Pat. Nos. 4,140,640 and 4,233,165 which disclose the preparation and use of water-in-oil acidizing fluids. These patents are incorporated herein by reference.

Illustrative acidizing fluids within the scope of the invention are illustrated in Table II. The numerical values in Table II are in parts by weight.

TABLE II

| | A | B | C | D | E | F |
|---|---|---|---|---|---|---|
| Diluent Blend Oil | 32.1 | — | 40 | — | 44 | — |
| Crude Oil | — | 32.1 | — | 40 | — | 44 |
| Water | 28.6 | 28.6 | — | — | — | — |
| Product of Example 11 | 10.7 | 10.7 | 10 | 10 | 6 | 6 |
| 37% Hydrochloric Acid Solution | 28.6 | 28.6 | 50 | 50 | 50 | 50 |

Explosive Emulsions

When the inventive emulsions are employed as explosive emulsions, such emulsions typically contain other additional additives such as sensitizing components, oxygen-supplying salts, particulate light metals, particulate solid explosives, soluble and partly soluble self-explosives, explosive oils and the like for purposes of augmenting the strength and sensitivity or decreasing the cost of the emulsion.

The sensitizing components are distributed substantially homogeneously throughout the emulsions. These sensitizing components are preferably occluded gas bubbles which may be introduced in the form of glass or resin microspheres or other gas-containing particulate materials. Alternatively, gas bubbles may be generated in-situ by adding to the composition and distributing therein a gas-generating material such as, for example, an aqueous solution of sodium nitrite. Other suitable sensitizing components which may be employed alone or in addition to the occluded or in-situ generated gas bubbles include insoluble particulate solid self-explosives such as, for example, grained or flaked TNT, DNT, RDX and the like and water-soluble and/or hydrocarbon-soluble organic sensitizers such as, for example, amine nitrates, alkanolamine nitrates, hydroxyalkyl nitrates, and the like. The explosive emulsions of the present invention may be formulated for a wide range of applications. Any combination of sensitizing components may be selected in order to provide an explosive composition of virtually any desired density, weight-strength or critical diameter.

The quantity of solid self-explosive ingredients and of water-soluble and/or hydrocarbon-soluble organic sensitizers may comprise up to about 40% by weight of the total emulsion. The volume of the occluded gas component may comprise up to about 50% of the volume of the total explosive emulsion.

Optional additional materials may be incorporated in the explosive emulsions of the invention in order to further improve sensitivity, density, strength, rheology and cost of the final explosive. Typical of materials found useful as optional additives include, for example, emulsion promotion agents such as highly chlorinated paraffinic hydrocarbons, particulate oxygen-supplying salts such as prilled ammonium nitrate, calcium nitrate, perchlorates, and the like, particulate metal fuels such as aluminum, silicon and the like, particulate non-metal fuels such as sulfur, gilsonite and the like, particulate inert materials such as sodium chloride, barium sulphate and the like, water phase or hydrocarbon phase thickeners such as guar gum, polyacrylamide, carboxymethyl or ethyl cellulose, biopolymers, starches, elastomeric materials, and the like, crosslinkers for the thickeners such as potassium pyroantimonate and the like, buffers or pH controllers such as sodium borate, zinc nitrate and the like, crystals habit modifiers such as alkyl naphthalene sodium sulphonate and the like, liquid phase extenders such as formamide, ethylene glycol and the like and bulking agents and additives of common use in the explosives art.

The quantities of optional additional materials used may comprise up to about 50% by weight of the total explosive composition, the actual quantities employed depending upon their nature and function.

A preferred method for making the water-in-oil explosive emulsions of the invention comprise the steps of (1) mixing the water, inorganic oxidizer salts and, in certain cases, some of the optional water-soluble compounds, in a first premix, (2) mixing the oil, emulsifying salt (C) and any other optional oil-soluble compounds, in a second premix and (3) adding the first premix to the second premix in a suitable mixing apparatus, to form a water-in-oil emulsion. The first premix is heated until all the salts are completely dissolved and the solution may be filtered if needed in order to remove any insoluble residue. The second premix is also heated to liquefy the ingredients. Any type of apparatus capable of either low or high shear mixing can be used to prepare the explosive emulsions of the invention. Glass microspheres, solid self-explosive ingredients such as particulate TNT, solid fuels such as aluminum or sulfur, inert materials such as barytes or sodium chloride, undissolved solid oxidizer salts and other optional materials, if employed, are added to the emulsion and simply blended until homogeneously dispersed throughout the composition.

The explosive emulsions of the invention can also be prepared by adding the second premix liquefied oil solution phase to the first premix hot aqueous solution phase with sufficient stirring to invert the phases. However, this method usually requires substantially more energy to obtain the desired dispersion than does the preferred reverse procedure. Alternatively, the explosive emulsion is particularly adaptable to preparation by a continuous mixing process where the two separately prepared liquid phases are pumped through a mixing device wherein they are combined and emulsified.

While the invention has been explained in relation to its preferred embodiments, it is to be understood that various modifications thereof will become apparent to those skilled in the art upon reading this specification. Therefore, it is to be understood that the invention disclaimed herein is intended to cover such modifications as fall within the scope of the appended claims.

I claim:

1. A water-in-oil emulsion comprising:
   (A) a continuous oil phase;
   (B) a discontinuous aqueous phase;
   (C) a minor emulsifying amount of at least one salt derived from (C)(I) at least one hydrocarbyl-substituted carboxylic acid or anhydride, or ester or amide derivative of said acid or anhydride, the hydrocarbyl substituent of (C)(I) having an average of from about 20 to about 500 carbon atoms, and (C)(II) at least one amine; and;
   (D) a functional amount of at least one water-soluble, oil-insoluble functional additive dissolved in said aqueous phase; with the proviso that when component (D) is ammonium nitrate, component (C) is other than an ester/salt formed by the reaction of polyisobutenyl (Mn=950) substituted succinic anhydride with diethylethanolamine in a ratio of one equivalent of anhydride to one equivalent of amine.

2. The emulsion of claim 1 wherein component (A) is present in said emulsion at a level in the range of from about 2% to about 70% by weight of said emulsion.

3. The emulsion of claim 1 wherein component (B) is present in said emulsion at a level in the range of from about 1% to about 98% by weight of said emulsion.

4. The emulsion of claim 1 wherein component (C) is present in said emulsion at a level in the range of from about 0.05% to about 30% by weight of said emulsion.

5. The emulsion of claim 1 wherein component (D) is present in said emulsion at a level in the range of from about 0.05% to about 95% by weight of said emulsion.

6. The emulsion of claim 1 wherein (C)(I) is derived from at least one alpha-beta olefinically unsaturated carboxylic acid or anhydride, or ester or amide derivative of said acid or anhydride, said acid or anhydride or derivative containing from 2 to about 20 carbon atoms exclusive of the carboxyl-based groups.

7. The emulsion of claim 1 wherein (C)(I) is a monocarboxylic acid or anhydride, or ester or amide derivative of said acid or anhydride.

8. The emulsion of claim 1 wherein (C)(I) is a polycarboxylic acid or anhydride, or ester or amide derivative of said acid or anhydride.

9. The emulsion of claim 1 wherein (C)(I) is represented by the formulae

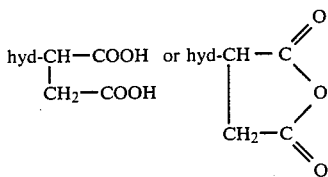

wherein hyd is said hydrocarbyl substituent of (C)(I).

10. The emulsion of claim 1 wherein component (C)(I) is an ester or an amide derived from at least one compound represented by the formulae

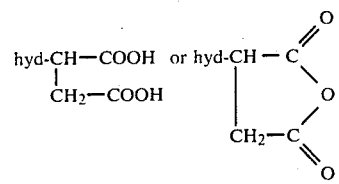

wherein hyd is said hydrocarbyl substituent of (C)(I).

11. The emulsion of claim 1 wherein said hydrocarbyl substituent of (C)(I) has an average of from about 30 to about 500 carbon atoms.

12. The emulsion of claim 1 wherein said hydrocarbyl substituent of (C)(I) has an average of from about 40 to about 500 carbon atoms.

13. The emulsion of claim 1 wherein said hydrocarbyl substituent of (C)(I) has an average of from about 50 to about 500 carbon atoms.

14. The emulsion of claim 1 wherein said hydrocarbyl substituent of (C)(I) is an alkyl or an alkenyl group.

15. The emulsion of claim 1 wherein said hydrocarbyl substituent of (C)(I) is a poly(isobutylene) group.

16. The emulsion of claim 1 wherein component (C)(I) comprises at least one amide derived from at least one primary and/or secondary amine.

17. The emulsion of claim 1 wherein component (C)(I) is derived from ammonia.

18. The emulsion of claim 1 wherein component (C)(I) comprises at least one amide derived from at least one monoamine, said monoamine being characterized by the presence within its structure of at least one primary or secondary amino group.

19. The emulsion of claim 1 wherein component (C)(I) comprises at least one amide derived from a polyamine containing at least one primary and/or secondary amino group.

20. The emulsion of claim 1 wherein component (C)(I) comprises at least one amide derived from an aliphatic, cycloaliphatic or aromatic primary or secondary monoamine.

21. The emulsion of claim 1 wherein component (C)(I) comprises at least one amide derived from at least one aliphatic, cycloaliphatic or aromatic polyamine containing at least one primary or secondary amino group.

22. The emulsion of claim 1 wherein component (C)(I) comprises a least one amide derived from at least one alkylene polyamine of the formula

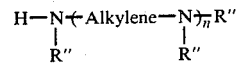

wherein n is a number in the range of from 1 to about 10, each R" is independently a hydrogen atom or a hydrocarbyl group having up to about 30 carbon atoms, and the Alkylene group has from 1 to about 10 carbon atoms.

23. The emulsion of claim 1 wherein component (C)(I) comprises at least one ester derived from at least one monohydric alcohol or at least one polyhydric alcohol.

24. The emulsion of claim 1 wherein component (C)(I) comprises at least one ester derived from at least one compound represented by the formula

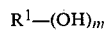

wherein R¹ is a monovalent or polyvalent organic group joined to the OH groups through carbon-to-oxygen bonds and m is an integer of from 1 to about 10.

25. The emulsion of claim 1 wherein component (C)(I) comprises at least one ester derived from at least one monohydroxy aromatic compound and/or at least one polyhydroxy aromatic compound.

26. The emulsion of claim 1 wherein component (C)(I) comprises at least one ester and/or amide derived from at least one hydroxyamine.

27. The emulsion of claim 1 wherein component (C)(I) comprises at least one ester and/or amide derived from at least one hydroxyamine containing at least one primary or secondary amino group.

28. The emulsion of claim 1 wherein component (C)(I) comprises at least one ester derived from diethylethanolamine.

29. The emulsion of claim 1 wherein component (C)(I) comprises at least one ester derived from said acid or anhydride and at least one alcohol, the ratio of said alcohol to said acid or anhydride being in the range of about 0.5 to about 3 equivalents of alcohol per equivalent of said acid or anhydride.

30. The emulsion of claim 1 wherein component (C)(I) comprises at least one amide derived from said acid or anhydride and at least one amine, the ratio of said amine to said acid or anhydride being in the range of about 0.5 to about 3 equivalents of amine per equivalent of said acid or anhydride.

31. The emulsion of claim 1 wherein component (C)(II) comprises at least one monoamine and/or at least one polyamine.

32. The emulsion of claim 1 wherein component (C)(II) comprises at least one primary, secondary and/or tertiary amine.

33. The emulsion of claim 1 wherein component (C)(II) comprises at least one aliphatic, cyclophatic and/or aromatic monoamine.

34. The emulsion of claim 1 wherein component (C)(II) comprises at least one aliphatic, cycloaliphatic and/or aromatic polyamine.

35. The emulsion of claim 1 wherein component (C)(II) comprises at least one alkylene polyamine of the formula

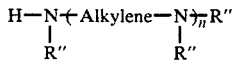

wherein n is a number of from 1 to about 10, each R″ is independently a hydrogen atom or a hydrocarbyl group having up to about 30 carbon atoms, and the Alkylene group has from 1 to about 10 carbon atoms.

36. The emulsion of claim 1 wherein component (C)(II) comprises (a) at least one N-(hydroxyl-substituted hydrocarbyl) amine, (b) at least one hydroxyl-substituted poly(hydrocarbyloxy) analog of (a), or (c) a mixture of (a) and (b).

37. The emulsion of claim 1 wherein component (C)(II) comprises at least one alkanol amine containing up to about 40 carbon atoms.

38. The emulsion of claim 1 wherein component (C)(II) is selected from the group consisting of (a) primary, secondary and tertiary alkanol amines which can be represented correspondingly by the formulae

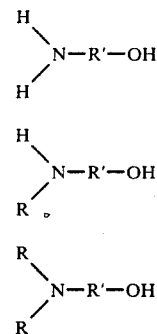

(b) hydroxyl-substituted oxyalkylene analogs of said alkanol amines represented by the formulae

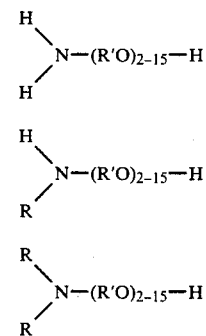

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c) mixtures of two of more thereof.

39. The emulsion of claim 1 wherein component (C)(II) is diethylethanolamine.

40. The emulsion of claim 1 wherein component (C)(II) is ammonia.

41. The emulsion of claim 1 wherein component (D) comprises at least one organic or inorganic acid or salt.

42. The emulsion of claim 1 wherein component (D) comprises at least one borate, molybdate and/or phosphate.

43. The emulsion of claim 1 wherein component (D) comprises at least one non-oxidizing salt.

44. The emulsion of claim 1 wherein component (D) comprises hydrochloric acid, sulfuric acid, hydrofluoric acid, sulfamic acid or at least one organic acid containing from 1 to about 3 carbon atoms.

45. The emulsion of claim 1 wherein component (D) comprises at least one oxygen-supplying salt.

46. The emulsion of claim 1 wherein component (D) comprises ammonium nitrate.

47. A hydraulic fluid comprising:
(A) a continuous oil phase;
(B) a discontinuous aqueous phase;
(C) a minor emulsifying amount of at least one salt derived from (C)(I) at least one hydrocarbyl-substituted carboxylic acid or anhydride, or ester or amide derivative of said acid or anhydride, the hydrocarbyl substituent of (C)(I) having an average of from about 20 to about 500 carbon atoms, and (C)(II) at least one amine; and (D) a functional amount of at least one borate, phosphate and/or molybdate dissolved in said aqueous phase.

48. An acidizing fluid comprising:
(A) a continuous oil phase;
(B) a discontinuous aqueous phase;
(C) a minor emulsifying amount of at least one salt derived from (C)(I) at least one hydrocarbyl-substituted carboxylic acid or anhydride, or ester or amide derivative of said acid or anhydride, the hydrocarbyl substituent of (C)(I) having an average of from about 20 to about 500 carbon atoms, and (C)(II) at least one amine; and
(D) a functional amount of at least one non-oxidizing acid dissolved in said aqueous phase.

49. The fluid of claim 48 wherein said acid selected from the group consisting of hydrochloric acid, sulfuric acid hydrofluoric acid, sulfamic acid or at least one organic acid containing from 1 to about 3 carbon atoms.

50. An explosive emulsion comprising:
(A) a continuous oil phase;
(B) a discontinuous aqueous phase;
(C) a minor emulsifying amount of at least one salt derived from (C)(I) at least one hydrocarbyl-substituted carboxylic acid or anhydride, or ester or amide derivative of said acid or anhydride, the hydrocarbyl substituent of (C)(I) having an average of from about 20 to about 500 carbon atoms, and (C)(II) at least one amine; and
(D) a functional amount of at least one oxygen-supplying salt dissolved in said aqueous phase; with the proviso that when component (D) is ammonium nitrate, component (C) is other than an ester/salt formed by the reaction of polyisobutenyl (Mn=950) substituted succinic anhydride with diethylethanolamine in a ratio of one equivalent of anhydride to one equivalent of amine.

51. The emulsion of claim 50 wherein component (D) is ammonium nitrate.

* * * * *